(12) United States Patent
Rusanovskyy et al.

(10) Patent No.: US 11,671,600 B2
(45) Date of Patent: Jun. 6, 2023

(54) SIGNALING INTENSITY DEPENDENT DEBLOCKING FILTERING FOR VIDEO CODING

(71) Applicant: QUALCOMM Incorporated, San Diego, CA (US)

(72) Inventors: Dmytro Rusanovskyy, San Diego, CA (US); Bappaditya Ray, La Jolla, CA (US); Geert Van der Auwera, Del Mar, CA (US); Adarsh Krishnan Ramasubramonian, Irvine, CA (US); Marta Karczewicz, San Diego, CA (US)

(73) Assignee: Shumaker & Sieffert, P.A, San Diego, CA (US)

(*) Notice: Subject to any disclaimer, the term of this patent is extended or adjusted under 35 U.S.C. 154(b) by 0 days.

(21) Appl. No.: 16/998,665

(22) Filed: Aug. 20, 2020

(65) Prior Publication Data
US 2021/0058622 A1 Feb. 25, 2021

Related U.S. Application Data

(60) Provisional application No. 62/891,197, filed on Aug. 23, 2019.

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

| | | | |
|---|---|---|---|
| 8,340,442 B1 * | 12/2012 | Rasche | H04N 19/126 382/254 |
| 2014/0003505 A1 * | 1/2014 | Lainema | H04N 19/30 375/240.12 |

(Continued)

FOREIGN PATENT DOCUMENTS

WO  WO-2010116202 A1 * 10/2010 ............... G06T 5/00

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.

(Continued)

*Primary Examiner* — Chikaodili E Anyikire
(74) *Attorney, Agent, or Firm* — Shumaker & Sieffert, P.A

(57) ABSTRACT

A method of decoding video data includes generating a prediction block for a current block of the video data and decoding a residual block for the current block of the video data. The method includes combining the prediction block and the residual block to generate a reconstructed block of the video data and determining a variable M×N sample pattern based on a block size of the current block. The method includes estimating a local luma level for samples of the reconstructed block using the variable M×N sample pattern and applying, based on the estimated local luma level, a deblocking filter to the samples of the reconstructed block to generate filtered samples. The method includes (Continued)

generating final samples of the video data based on the filtered samples.

29 Claims, 18 Drawing Sheets

(51) Int. Cl.
    *H04N 19/176*      (2014.01)
    *H04N 19/119*      (2014.01)
    *H04N 19/186*      (2014.01)
    *H04N 19/105*      (2014.01)

(52) U.S. Cl.
    CPC ......... *H04N 19/119* (2014.11); *H04N 19/176* (2014.11); *H04N 19/186* (2014.11)

(56) References Cited

U.S. PATENT DOCUMENTS

| | | | | |
|---|---|---|---|---|
| 2016/0366422 | A1* | 12/2016 | Yin | H04N 19/649 |
| 2019/0149823 | A1* | 5/2019 | Lim | H04N 19/124 |
| | | | | 375/240.03 |
| 2020/0204799 | A1* | 6/2020 | Lee | H04N 19/159 |
| 2021/0021841 | A1* | 1/2021 | Xu | H04N 19/80 |

OTHER PUBLICATIONS

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v10, Jun. 11, 2019 (Jun. 11, 2019), XP030205561, pp. 1-408, Retrieved from the Internet: URL:http://phenix.int-evry.fr/jvet/doc_end_user/documents/14_Geneva/wg11/JVET-N1001-v10.zip JVET-N1001-v10.docx [retrieved on Jun. 11, 2019].

Bross B., et al., "Versatile Video Coding (Draft6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip, URL:http://phenix.int-evry.fr/mpegjdoc_end_user/documents/127Gothenburg/wg11/m49908-JVET-O2001-V14-JVET-O2001-VE.zip, JVET-O2001-V8.docx [retrieved on Jul. 15, 2019].

Chen J., et al., "Algorithm Description for Versatile Video Coding and Test Model 5 (VTM 5)", 14th JVET Meeting, Mar. 19, 2019-Mar. 27, 2019, Geneva, (The Joint Video Exploration Team of ISO/IEC JTC1/SC29/WG11 and ITU-T SG.16 WP 3), No. JVET-N1002-v1, May 21, 2019, XP030205194, 70 Pages, Retrieved from the Internet: URL:http://phenix.int-evry.fr/jvet/doc_end_user/documents/14_Geneva/wg11/JVET-N1002-v1.zip JVET-N1002-v1.docx.

Chen J., et al., "Algorithm Description for Versatile Video Coding and Test Model 6 (VTM 6)", 127th MPEG Meeting, Jul. 8, 2019-Jul. 12, 2019, Gothenburg, (Motion Picture Expert Group or ISO/IEC JTC1/SC29/WG11), No. m49914, Joint Video Experts Team (JVET) of ITU-T SG 16 WP 3 and ISO/IEC JTC 1/SC 29/WG 11, 15th Meeting, Gothenburg, SE, Jul. 3-12, 2019, JVET-O2002-v1, Aug. 15, 2019 (Aug. 15, 2019), XP030208572, 82 Pages, Retrieved from the Internet: URL:http://phenix.int-evry.fr/mpeg/doc_end_user/documents/127_Gothenburg/wg11/m49914-JVET-O2002-v1-JVET-O2002-v1.zipJVET-O2002-v1.docx[retrieved on Aug. 15, 2019].

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Ichigaya A., et al. "CE11: Luma-adaptive deblocking filter (CE11.2.2)", JVET-L0414, Joint Video Experts Team (JVET) of ITU-T SG 16 WP 3 and ISO/IEC14 UTC 1/5C 29/WG 11, 12th Meeting: Macao, CN, Oct. 3-12, 2018, pp. 1-5.

ITU-R BT.1886, "Reference Electro-Optical Transfer Function for Flat Panel Displays used in HDTV Studio Production", ITU-R Radiocommunication Sector of ITU, BT Series, Mar. 2011, 7 pages.

ITU-R Recommendation BT.2020 "Parameter Values for Ultra-High Definition Television Systems for Production and International Programme Exchange" Aug. 2012, 7 pages.

ITU-R Recommendation BT.709-5, "Parameter Values for the HDTV Standards for Production and Programme Exchange", Apr. 2002, 32 pages.

ITU-T H.265, Series H: Audiovisual and Multimedia Systems, Infiastructure of Audiovisual Services—Coding of Moving Video, High Efficiency Video Coding, The International Telecommunication Union, Jun. 2019, 696 Pages.

Ramasubramonian (QUALCOMM) A K., et al., "AHG15: On Signalling of Chroma QP Tables", 15th JVET Meeting, Jul. 3, 2019-Jul. 12, 2019, Gothenburg, (The Joint Video Exploration Team of ISO/IEC JTC1/SC29/WG11 and ITU-TSG.16 WP 3), No. JVET-O0650-v4, Jul. 12, 2019 (Jul. 12, 2019), XP030220166, 4 Pages, Retrieved from the Internet: URL: http://phenix.int-evry.fr/jvet/doc_end_user/documents/15_Gothenburg/wg11/JVET-O0650-v4.zip JVET-O0650-v4.docx, [retrieved on Jul. 12, 2019].

Ray et al., "Non-CE5: On the Average Calculation for Luma Adaptive Deblocking Filter", Joint Video Experts Team (JVET) of ITU-T SG 16 WP 3 and ISO/IEC14 UTC 1/5C 29/WG 11, 16th Meeting, Geneva, CH, Oct. 1-11, 2019, JVET-P0613-v1, pp. 1-6.

Segall et al., "JVET common test conditions and evaluation procedures for HDR/WCG video", JVET-N1011, Joint Video Experts Team (JVET) of ITU-T SG 16 WP 3 and ISO/IEC14 UTC 1/5C 29/WG 11, 14th Meeting, Geneva, CH, Mar. 19-27, 2019, pp. 1-9.

SMPTE Standard for Motion-Picture Film (8-mm TypeR)—Camera Aperture Image and Usage, SMPTE 231-2004, Society of Motion Picture & Television Engineers, Nov. 8, 2004, 4 pages.

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, pp. 1-14, ISBN: 978-1-61482-829-7.

\* cited by examiner

SPLIT_TT_HOR

SPLIT_TT_VER

SPLIT_BT_HOR

SPLIT_BT_VER

SIGNALING INTENSITY DEPENDENT DEBLOCKING FILTERING FOR VIDEO CODING

This application claims the benefit of U.S. Provisional Application No. 62/891,197, filed on Aug. 23, 2019, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signal intensity dependent deblocking filtering for video coding. For example, a video coder (e.g., video encoder or video decoder) may apply deblocking filtering to samples along a boundary of a current block (e.g., a P block) of video data and an adjacent block (e.g., a Q block) of video data using a sample pattern. For instance, the video coder may determine a filter strength (e.g., a degree of smoothness) for the deblocking filtering based on a local luma level (e.g., an average luma level) of samples within the sample pattern. In accordance with the techniques of the disclosure, the video coder may determine a variable M×N sample pattern based on a block size. For example, rather than estimating a local luma level using a fixed 4×4 sample pattern regardless of a block size of the current block, the video coder may estimate the local level using an 8×8 sample pattern for relatively large blocks and may estimate the local level using a 4×4 sample pattern for relatively small blocks. A video coder configured to apply a variable M×N sample pattern may potentially improve a computational efficiency of the video coder with little to no loss in coding accuracy.

In one example, a method of decoding video data includes generating a prediction block for a current block of the video data and decoding a residual block for the current block of the video data. The method further includes combining the prediction block and the residual block to generate a reconstructed block of the video data and determining a variable M×N sample pattern based on a block size of the current block. The M and N are each integer values being equal to or larger than 1. The method further includes estimating a local luma level for samples of the reconstructed block using the variable M×N sample pattern and applying, based on the estimated local luma level, a deblocking filter to the samples of the reconstructed block to generate filtered samples. The method further includes generating final samples of the video data based on the filtered samples.

In another example, a method of encoding video data includes generating a prediction block for a current block of the video data and encoding a residual block for the current block of the video data. The method further includes reconstructing the residual block for the current block of the video data to generate a reconstructed residual block and combining the prediction block and the reconstructed residual block to generate a reconstructed block of the video data. The method further includes determining a variable M×N sample pattern based on a block size of the current block. M and N are each integer values being equal to or larger than 1. The method further includes estimating a local luma level for samples of the reconstructed block using the variable M×N sample pattern and applying, based on the estimated local luma level, a deblocking filter to the samples of the reconstructed block to generate filtered samples. The method further includes generating final samples of the video data based on the filtered samples.

In one example, a device for decoding video data includes one or more processors implemented in circuitry and configured to generate a prediction block for a current block of the video data and decode a residual block for the current block of the video data. The one or more processors are further configured to combine the prediction block and the residual block to generate a reconstructed block of the video data and determine a variable M×N sample pattern based on a block size of the current block. M and N are each integer values being equal to or larger than 1. The one or more processors are further configured to estimate a local luma level for samples of the reconstructed block using the variable M×N sample pattern and apply, based on the estimated local luma level, a deblocking filter to the samples of the reconstructed block to generate filtered samples. The one or more processors are further configured to generate final samples of the video data based on the filtered samples.

In another example, a device for encoding video data includes one or more processors implemented in circuitry and configured to generate a prediction block for a current block of the video data and encode a residual block for the current block of the video data. The one or more processors are further configured to reconstruct the residual block for the current block of the video data to generate a reconstructed residual block and combine the prediction block and the reconstructed residual block to generate a reconstructed block of the video data. The one or more processors are further configured to determine a variable M×N sample pattern based on a block size of the current block. M and N are each integer values being equal to or larger than 1. The one or more processors are further configured to estimate a local luma level for samples of the reconstructed block using the variable M×N sample pattern and apply, based on the estimated local luma level, a deblocking filter to the samples of the reconstructed block to generate filtered samples. The one or more processors are further configured to generate final samples of the video data based on the filtered samples.

In one example, a device for encoding video data includes means for generating a prediction block for a current block of the video data and means for decoding a residual block for the current block of the video data. The device further includes means for combining the prediction block and the residual block to generate a reconstructed block of the video data and means for determining a variable M×N sample pattern based on a block size of the current block. M and N are each integer values being equal to or larger than 1. The device further includes means for estimating a local luma level for samples of the reconstructed block using the variable M×N sample pattern and means for applying, based on the estimated local luma level, a deblocking filter to the samples of the reconstructed block to generate filtered samples. The device further includes means for generating final samples of the video data based on the filtered samples.

In another example, a device for decoding video data includes means for generating a prediction block for a current block of the video data and encoding a residual block for the current block of the video data. The device further includes means for reconstructing the residual block for the current block of the video data to generate a reconstructed residual block and combining the prediction block and the reconstructed residual block to generate a reconstructed block of the video data. The device further includes means for determining a variable M×N sample pattern based on a block size of the current block. M and N are each integer values being equal to or larger than 1. The device further includes means for estimating a local luma level for samples of the reconstructed block using the variable M×N sample pattern and means for applying, based on the estimated local luma level, a deblocking filter to the samples of the reconstructed block to generate filtered samples. The device further includes means for generating final samples of the video data based on the filtered samples.

The details of one or more examples are set forth in the accompanying drawings and the description below. Other features, objects, and advantages will be apparent from the description, drawings, and claims.

DETAILED DESCRIPTION

Figure 1:
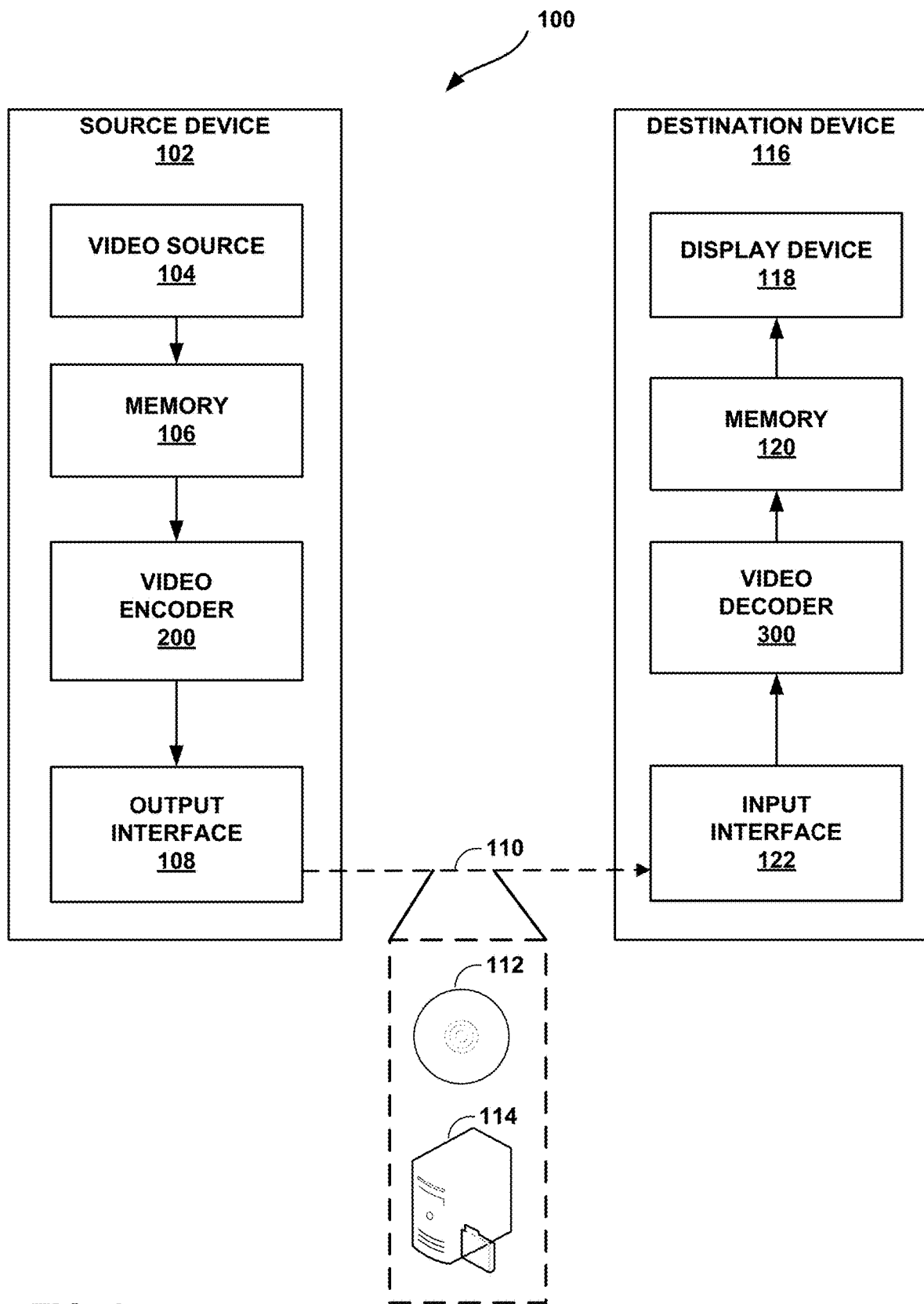
FIG. 1 is a block diagram illustrating an example video encoding and decoding system that may perform the techniques of this disclosure.

In general, this disclosure describes techniques for implementation aspects of signal intensity dependent deblocking filtering for video coding. For example, a video coder (e.g., video encoder or video decoder) may apply deblocking filtering to samples along a boundary of a current block (e.g., a P block) of video data and an adjacent block (e.g., a Q block) of video data. For instance, the video coder may apply a deblocking filter that improves a visual quality and prediction performance of reproduced video data by smoothing sharp edges which can form between different blocks (e.g., between a P block and a Q block).

In some examples, a video coder (e.g., video encoder or video decoder) may determine one or more parameters of the deblocking filter (e.g., a strength of the deblocking filter) based on a reconstructed average luma level. For example, the video coder may apply a deblocking filter to samples along a boundary of a current block with a strength that is based on the reconstructed average luma level. Rather than calculating the reconstructed average luma level for all samples, the video coder may be configured to estimate a local luma level for samples of a reconstructed block that represents the reconstructed average. For example, the video coder may, for each 4×4 grid of samples along the boundary of the current block, estimate the estimated local luma level using a luma level of two samples of the current block (e.g., a P block) and two samples of an adjacent neighboring block (e.g., a Q block). For instance, the video coder may determine the estimated local luma level using an average of a first luma sample at the 0 line of the current block, a second luma sample at the 3rd line of the current block, a third luma sample at the 0 line of an adjacent block and a fourth luma sample at the 3rd line of the adjacent block. Estimating a local luma level may potentially improve a computational efficiency of the video coder with little to no loss in coding accuracy compared to video coders that generate a reconstructed average of luma samples.

One or more problems may exist in systems that use a fixed 4×4 grid of samples to estimate the estimated local luma level for samples of a reconstructed block that represents the reconstructed average. For example, a video coder (e.g., video encoder or video decoder) configured to estimate a local luma level from a single 0th line on each side of the boundary may not accurately generate the estimated local luma level to represent a local brightness and/or may not be aligned with other parameters, e.g., derivation estimated group of samples from 0th and 3rd lines/column. In some examples, estimating a local luma level from a single 0th line on each side of the boundary (e.g., a fixed grid 2×4) may not represent local brightness for samples being addressed by a longer deblocking filter, e.g., 3 filtered samples on each side, 5 filtered samples on each side, or 7 filtered samples on each side. For the deblocking of a chroma component, the video coder may not use an offset (e.g., a qpOffset(LL)) resulting from signal intensity for the calculation of qPi (i.e., the input to the ChromaQpTable). As such, the deblocking filtering of chroma components of the video data may not account for the estimated local luma level.

Techniques described herein may represent one or more solutions to the above listed problems as well as to other problems, and thereby improve the operation of a video coder or video coding process. For example, a video coder (e.g., video encoder or video decoder) may be configured to determine a variable M×N sample pattern based on a block size of the current block, and may accurately generate the estimated local luma level to represent a local brightness and/or may be aligned with other parameters. In some examples, the video coder may be configured to determine the variable M×N sample pattern based on a block size of the current block such that the video coder may accurately estimate a local luma level for samples being addressed by a longer deblocking filter, e.g., 3 filtered samples on each side, 5 filtered samples on each side, or 7 filtered samples on each side. In some examples, the video coder may determine the estimated local luma level or a control offset for a luma deblocking filtering that may be used to control a chroma deblocking filter such that the deblocking filtering of chroma components of the video data may account for the estimated local luma level.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for estimating a local luma level from the variable M×N sample pattern. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for estimating a local luma level from the variable M×N sample pattern. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (e.g., video encoder 200 or video decoder 300) may be configured to determine a variable M×N sample pattern based on a block size of a current block. That is, rather than estimating a local luma level using a constant sample pattern (e.g., a 4×4 sample pattern) regardless of a block size of the current block, the video coder may estimate the local level using an 8×8 sample pattern for relatively large blocks (e.g., 32×32 and larger) and may estimate the local level using a 4×4 sample pattern for relatively small blocks (e.g., smaller than 32×32). A video coder configured to apply a variable M×N sample pattern may potentially improve a computational efficiency of the video coder with little to no loss in coding accuracy.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
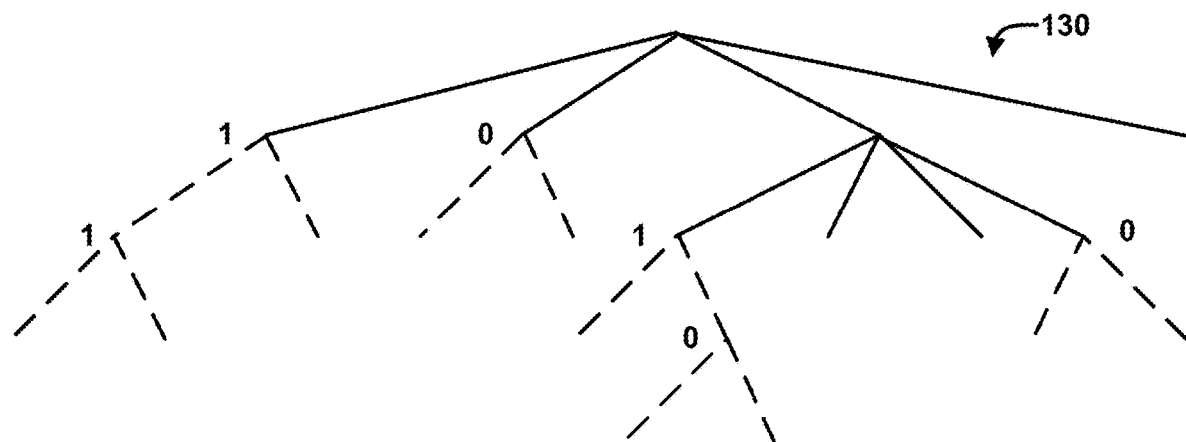
FIGS. 2A and 2B are conceptual diagrams illustrating an example quadtree binary tree (QTBT) structure, and a corresponding coding tree unit (CTU).
Figure 2B:
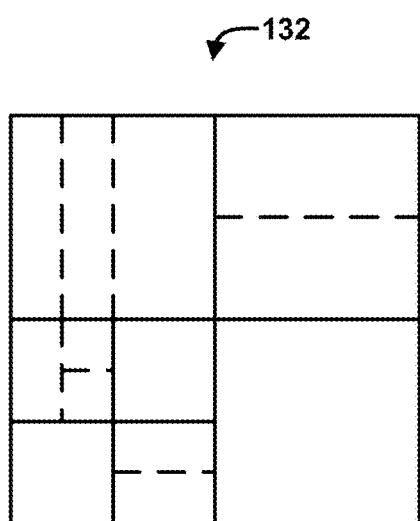

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

FIG. 2B shows visualization of a CTU 132 divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as CTU 132 or as small as 4×4 in units of luma samples and 2×2 corresponding chroma coding blocks for 4:2:0 sampling format. For the case of the 4:2:0 chroma format, the maximum chroma CB size may be 64×64 and the minimum chroma CB size may be 2×2.

A ternary-tree (TT) split may be forbidden when either width or height of a luma coding block is larger than 64, TT split may also be forbidden when either width or height of a chroma coding block is larger than 32. For a 128×N CU with N<64 (i.e., width equal to 128 and height smaller than 128), a horizontal binary tree (BT) may not be allowed. For an N×128 CU with N<64 (i.e., height equal to 128 and width smaller than 128), a vertical BT may not be allowed.

Figure 3:
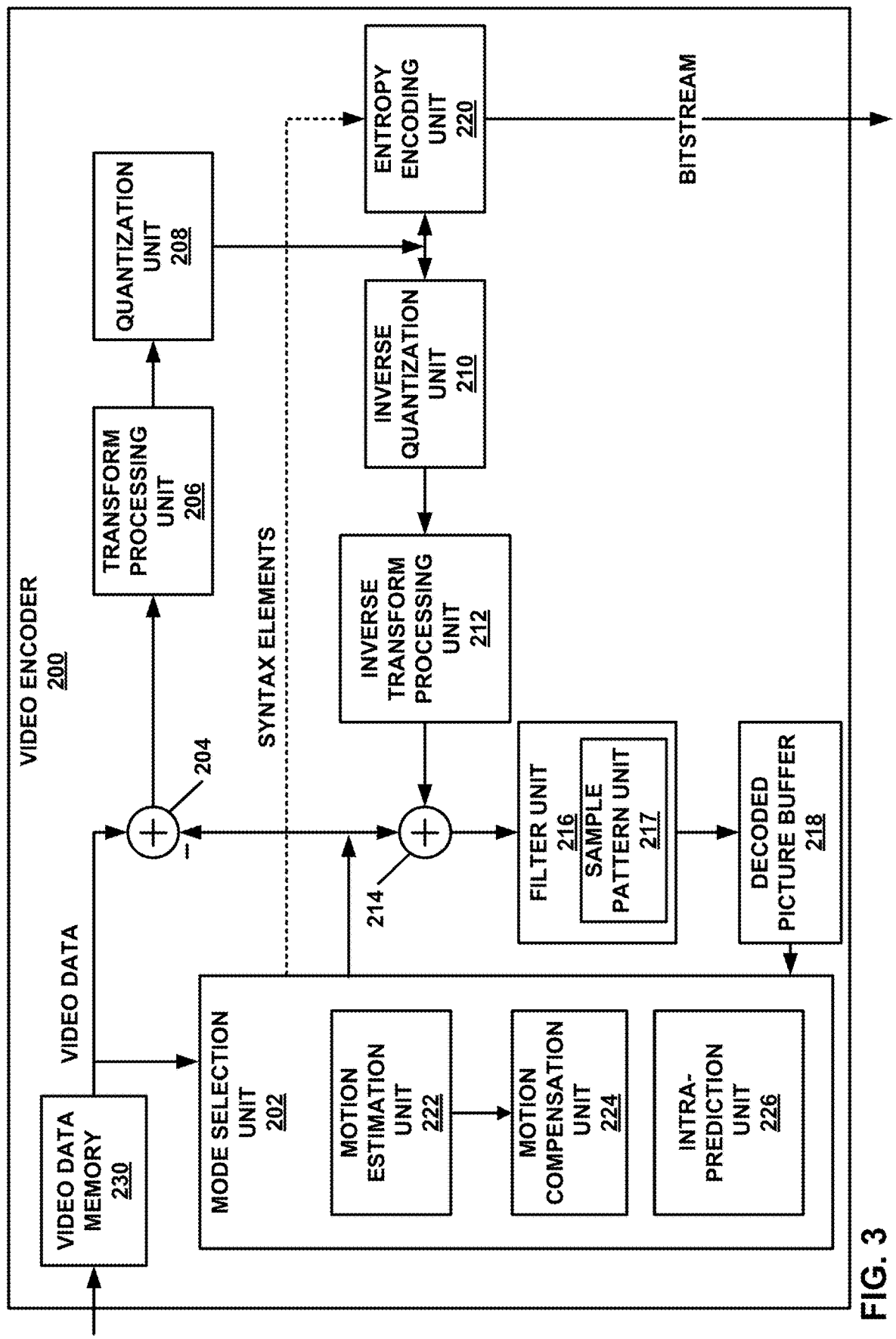
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the ITU-T H.265 (HEVC) video coding standard and the ITU-T H.266 (VVC) video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. As shown, filter unit 216 may include sample pattern unit 217. Sample pattern unit 217 may be configured to determine a variable M×N sample pattern based on a block size of the current block. Filter unit 216 may estimate a local luma level for samples of the reconstructed block using the variable M×N sample pattern and apply, based on the estimated local luma level, a deblocking filter to the samples of the reconstructed block to generate filtered samples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to generate a prediction block for a current block of the video data and encode a residual block for the current block of the video data. The device is further configured to reconstruct the residual block for the current block of the video data to generate a reconstructed residual block and combine the prediction block and the reconstructed residual block to generate a reconstructed block of the video data. The device is further configured to determine a variable M×N sample pattern based on a block size of the current block, wherein M and N are each integer values being equal to or larger than 1. The device is further configured to estimate a local luma level for samples of the reconstructed block using the variable M×N sample pattern and apply, based on the estimated local luma level, a deblocking filter to the samples of the reconstructed block to generate filtered samples. The device is further configured to generate final samples of the video data based on the filtered samples.

Figure 4:
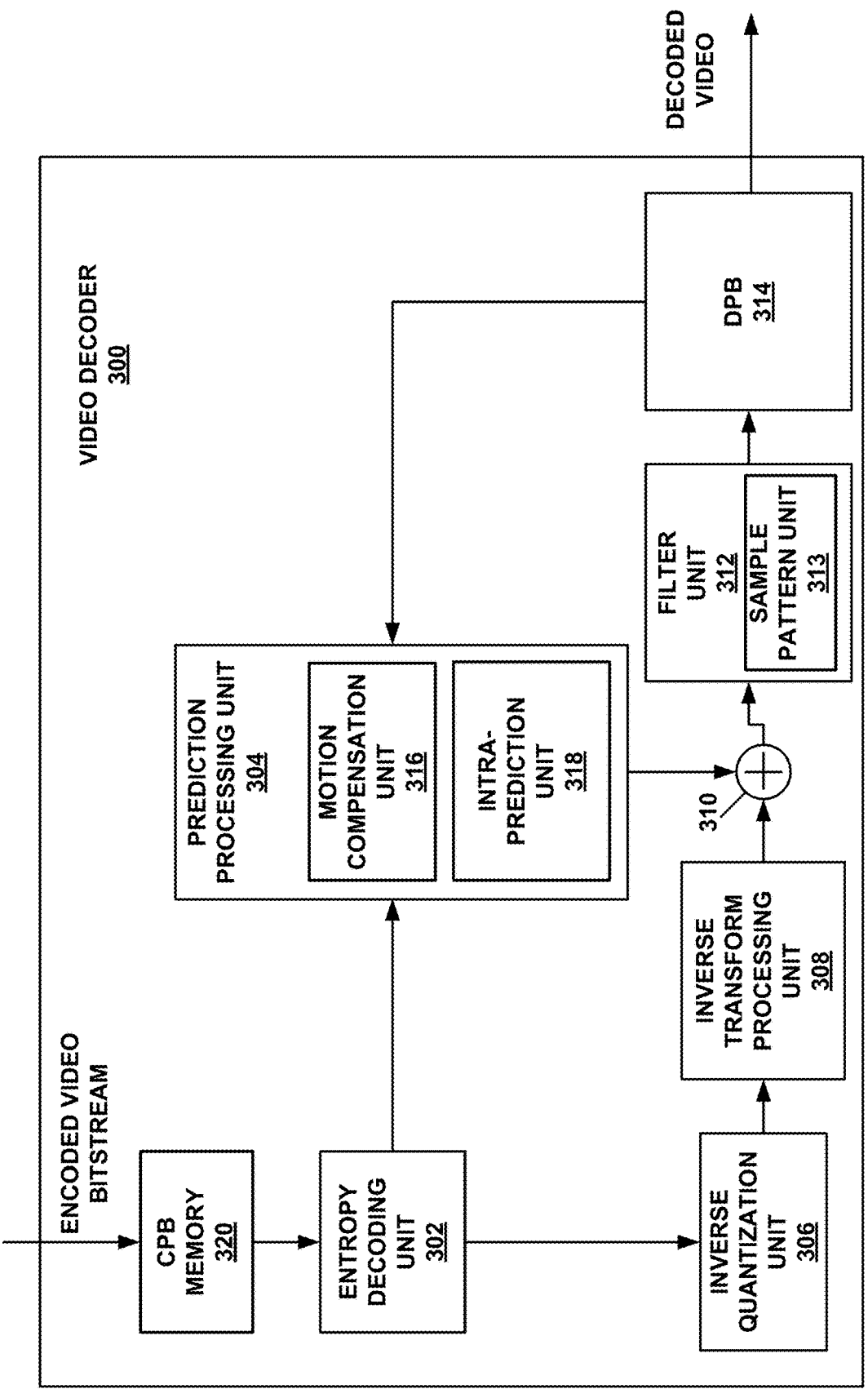
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. As shown, filter unit 312 may include sample pattern unit 313. Sample pattern unit 313 may be configured to determine a variable M×N sample pattern based on a block size of the current block. Filter unit 313 may estimate a local luma level for samples of the reconstructed block using the variable M×N sample pattern and apply, based on the estimated local luma level, a deblocking filter to the samples of the reconstructed block to generate filtered samples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to generate a prediction block for a current block of the video data and decode a residual block for the current block of the video data. The device may be configured to combine the prediction block and the residual block to generate a reconstructed block of the video data and determine a variable M×N sample pattern based on a block size of the current block, wherein M and N are each integer values being equal to or larger than 1. The device may be configured to estimate a local luma level for samples of the reconstructed block using the variable M×N sample pattern and apply, based on the estimated local luma level, a deblocking filter to the samples of the reconstructed block to generate filtered samples. The device may be configured to generate final samples of the video data based on the filtered samples.

This disclosure discusses implementation aspects of signal intensity dependent deblocking filtering for video coding. Signal intensity dependent deblocking may be beneficial for coding of video data representations with non-uniformly of samples that are distributed to be barely perceived to have a noticeable difference (e.g., signal to noise ratio) of the data over the data's dynamic range, e.g., high dynamic range (HDR) and wide color gamut (WCG) content. Several implementations that help to ensure parallel implementation of deblocking filtering process are described herein.

Video coding standards may include, for example, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). Again, techniques described herein may be applied to VVC Draft 6, other versions of VVC, and other standards.

Video applications may operate with video data representing captured scenery with HDR and WCG. Parameters of the utilized dynamic range and color gamut are two independent attributes of video content, and the specification of dynamic range and color gamut for purposes of digital television and multimedia services are defined by several international standards. For example, ITU-R Rec. 709 defines parameters for HDTV such as Standard Dynamic Range and standard color gamut. On the other hand, ITU-R Rec.2020 specifies ultra-high-definition (UHD) television (UHDTV) parameters such as High Dynamic Range, and wide color gamut. There are also other standard development organizations (SDOs) documents specifying these attributes in other systems, e.g., P3 color gamut is defined in society of motion picture & television engineers (SMPTE) 231-2, for Motion-Picture Film (8-mm Type R)-Camera Aperture Image and Usage, Nov. 8, 2004 (hereinafter, "SMPTE-231-2") and some parameters of HDR are defined in ST 2084:2014—SMPTE Standard—High Dynamic Range Electro-Optical Transfer Function of Mastering Reference Displays (hereinafter, "STMPTE-2084"). A brief description of dynamic range and color gamut for video data is provided below.

Dynamic range may be defined as the ratio between the minimum and maximum brightness of the video signal. Dynamic range may also be measured in terms of 'f-stop', where one f-stop corresponds to a doubling of the signal dynamic range. In MPEG's definition, the high dynamic range content is such content that features brightness variation with more than 16 f-stops. In some terms, levels between 10 and 16 f-stops are considered as intermediate dynamic range, but 16 f-stops is considered HDR in other definitions. At the same time, the human visual system is capable of perceiving a much larger dynamic range; however, the human visual system includes an adaptation mechanism to narrow the dynamic range.

Current video application and services are regulated by ITU-R BT.709-5: Parameter values for the HDTV standards for production and international programme exchange (hereinafter, "Rec.709") and provide Standard-Dynamic-Range (SDR), typically supporting a range of brightness (or luminance) of around 0.1 to 100 candelas (cd) per m2 (often referred to as "nits"), leading to less than 10 f-stops. The next generation video services are expected to provide dynamic range of up-to 16 f-stops and although a detailed specification is currently under development, some initial parameters have been specified in "High Dynamic Range Electro-Optical Transfer Function of Mastering Reference Displays," SMPTE ST 2084:2014, The Society of Motion Picture and Television Engineers, Aug. 16, 2014 (hereinafter, "SMPTE-2084") and ITU-R Recommendation BT.2020, "Parameter values for ultra-high definition television systems for production and international programme exchange," 2012. (Hereinafter, "Rec.2020").

Figure 5:
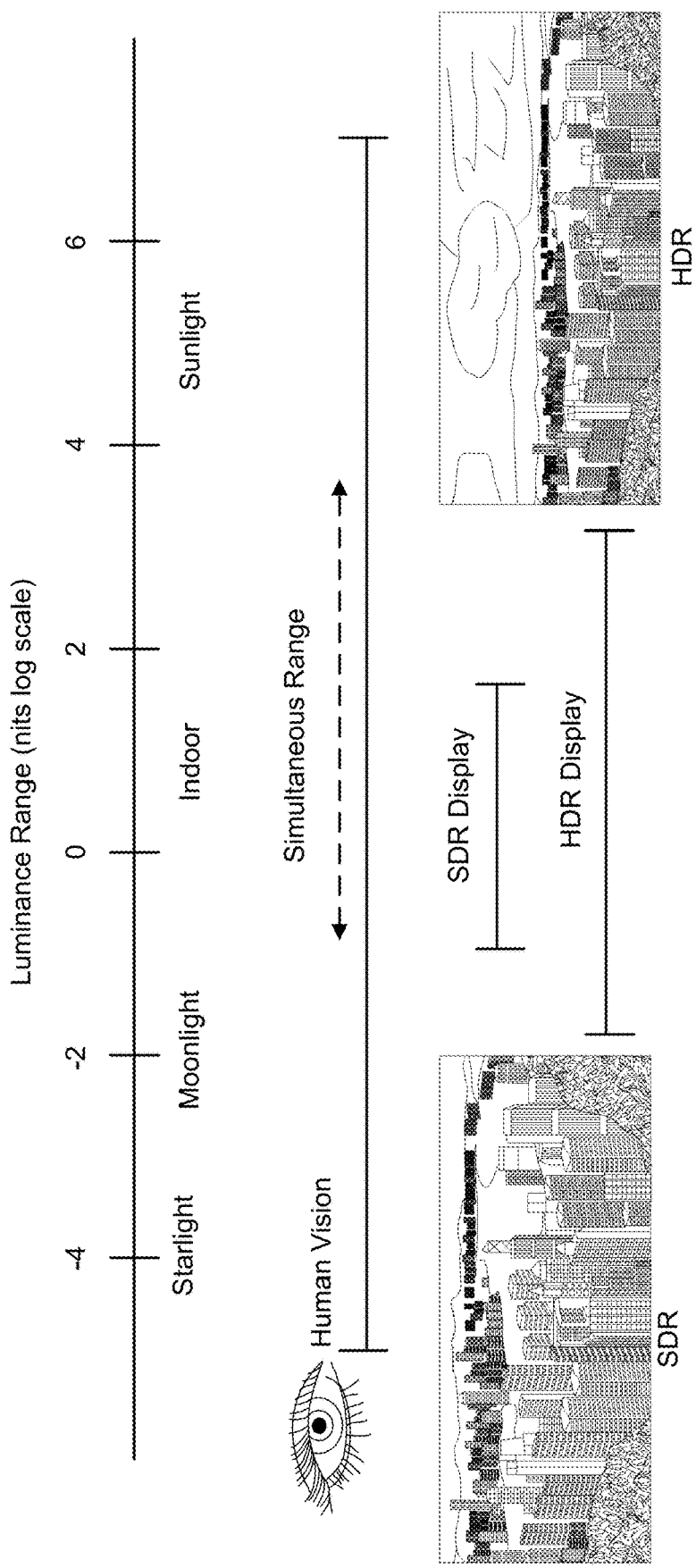
FIG. 5 is a conceptual diagram illustrating human vision and display capabilities.

FIG. 5 is a conceptual diagram illustrating human vision and display capabilities. Visualization of dynamic range provided by SDR of HDTV and expected HDR of UHDTV and human visual system (HVS) dynamic range are shown in FIG. 5.

Figure 6:
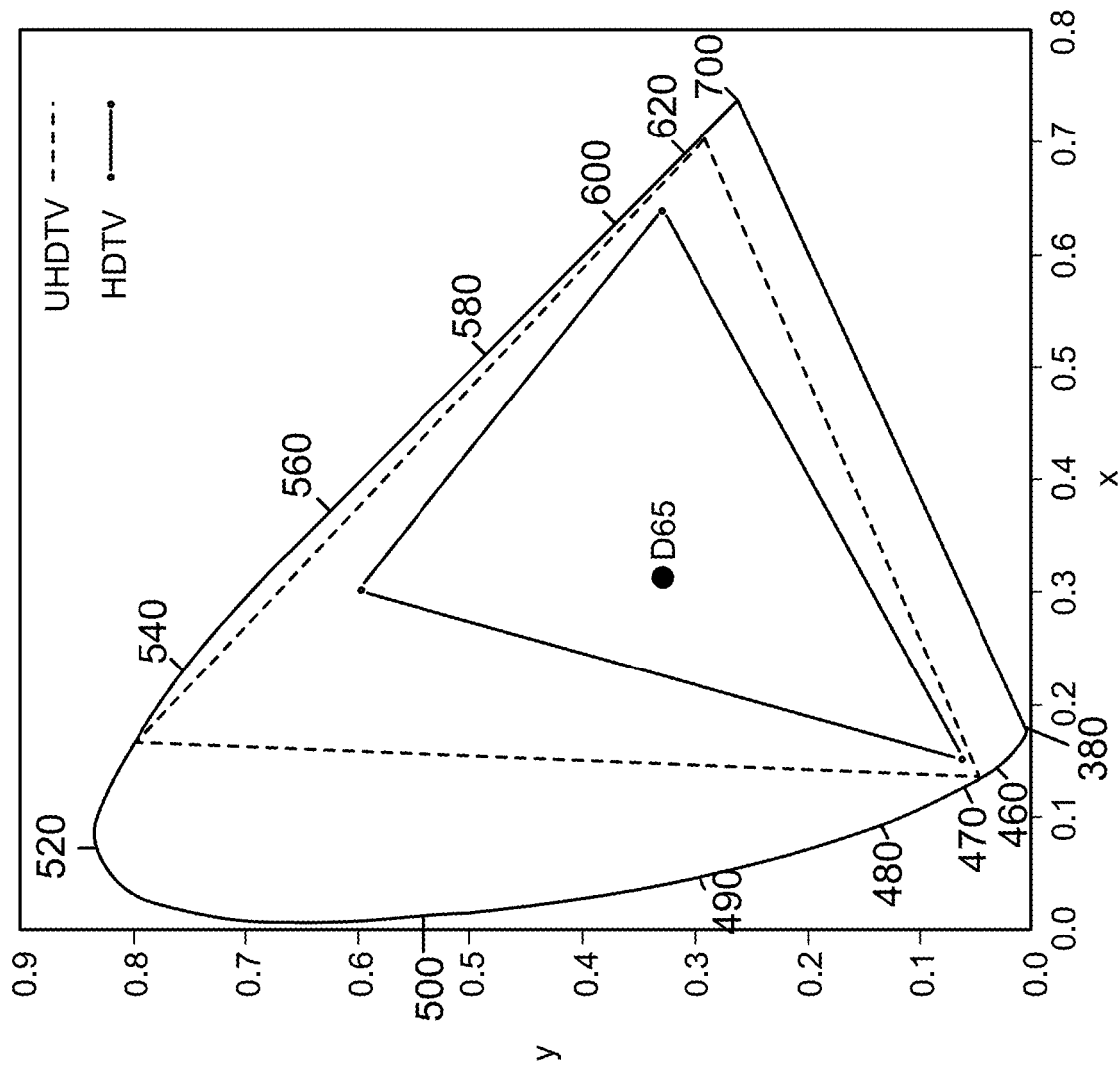
FIG. 6 is a conceptual diagram illustrating example color gamuts.

FIG. 6 is a conceptual diagram illustrating example color gamuts. Another aspect for a more realistic video experience besides HDR is the color dimension, which is conventionally defined by the color gamut. FIG. 6 visualizes SDR color gamut (e.g., triangle based on the BT.709 red, green and blue color primaries), and the wider color gamut for UHDTV (triangle based on the BT.2020 red, green and blue color primaries). FIG. 6 also depicts the spectrum locus (e.g., delimited by the tongue-shaped area), representing limits of the natural colors. As illustrated by FIG. 6, moving from BT.709 to BT.2020 color primaries aims to provide UHDTV services with about 70% more colors. D65 specifies the white color for given specifications.

Examples of color gamut parameters specification are shown in Table 1.

TABLE 1

Color gamut parameters
RGB color space parameters

| Color space | White point | | Primary colors | | | | | |
|---|---|---|---|---|---|---|---|---|
| | $x_W$ | $y_W$ | $x_R$ | $y_R$ | $x_G$ | $y_G$ | $x_3$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

Video encoder 200 and video decoder 300 may be configured to acquire and store HDR/WCG at a very high precision per component (e.g., floating point), with the 4:4:4 chroma format and a very wide color space (e.g., XYZ). The 4:4:4 chroma format and a very wide color space representation targets high precision and is (almost) mathematically lossless. However, this format feature may include a lot of redundancies and may not be optimal for compression purposes. Video encoder 200 and video decoder 300 may be configured to use a lower precision format with HVS-based assumption for state-of-the-art video applications.

Figure 7:
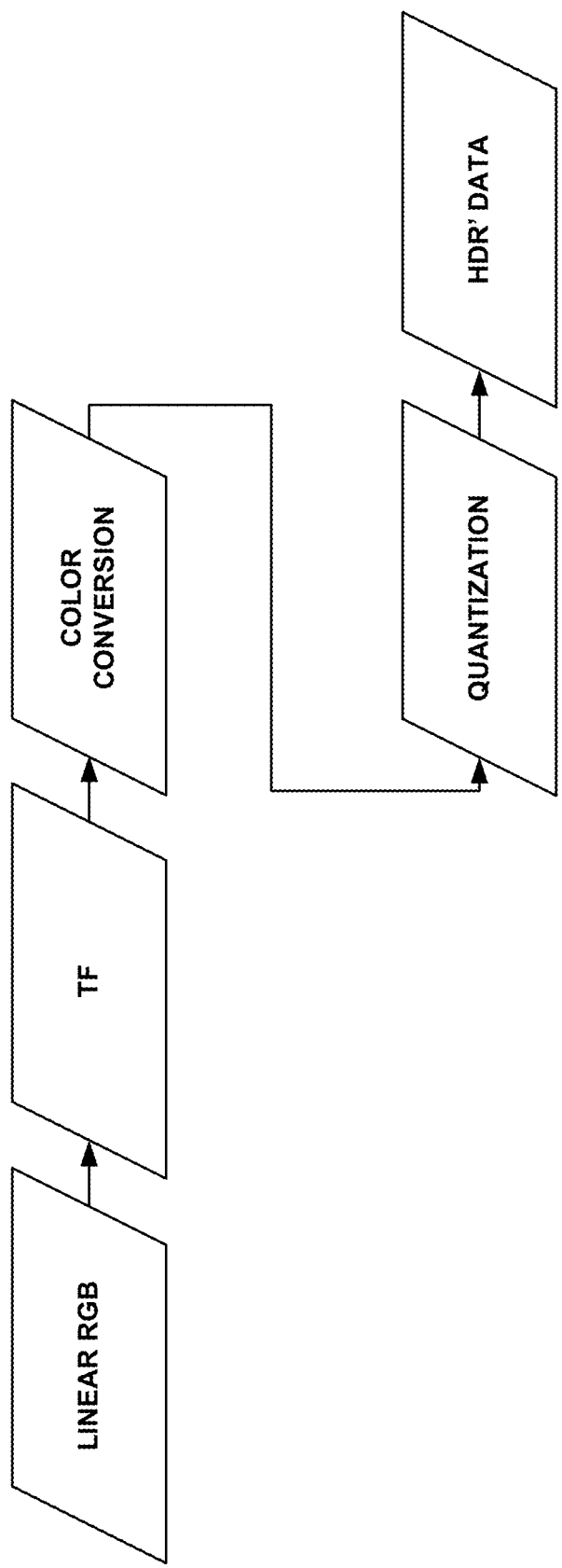
FIG. 7 is a conceptual diagram illustrating Example of High Dynamic Range (HDR)/Wide Color Gamut (WCG) representation conversion.

FIG. 7 is a conceptual diagram illustrating an example of High Dynamic Range (HDR)/Wide Color Gamut (WCG) representation conversion. Video data format conversion for purposes of compression may include 3 elements, as shown in FIG. 7.

1. Non-linear transfer function (TF) for dynamic range compacting
2. Color Conversion to a more compact or robust color space
3. Floating-to-integer representation conversion (e.g., Quantization)

Video encoder 200 and video decoder 300 may be configured to compact the high dynamic range of input RGB data ("LINEAR RGB") in a linear and floating point representation with the utilized non-linear transfer function TF, e.g., corresponding to SMPTE-2084, following which video encoder 200 and video decoder 300 may be configured to convert the compacted high dynamic range of input RGB data to a target color space more suitable for compression, e.g., YCbCr, and then quantize the converted high dynamic range of input RGB data to achieve integer representation ("HDR' DATA"). The order of these elements is given as an example, and may vary in real-world applications, e.g., color conversion may precede the TF module, as well as additional processing, e.g., spatial subsampling may be applied to color components.

Video encoder 200 and video decoder 300 may be configured to map the digital values appearing in an image container to and from optical energy using the "transfer function". Video encoder 200 and video decoder 300 may be configured to apply the transfer function (TF) to the data to compact the data's dynamic range and represent the data with a limited number of bits. The transfer function may be a one-dimensional (1D) non-linear function either reflecting the inverse of an electro-optical transfer function (EOTF) of the end-user display as specified for SDR in ITU-R BT. 1886 (also defined in Rec.709), approximating the HVS perception to brightness changes as for PQ TF specified in SMPTE-2084 for HDR, or another function. The inverse process of the OETF is the EOTF (Electro-Optical Transfer Function), which maps the code levels back to luminance.

Figure 8:
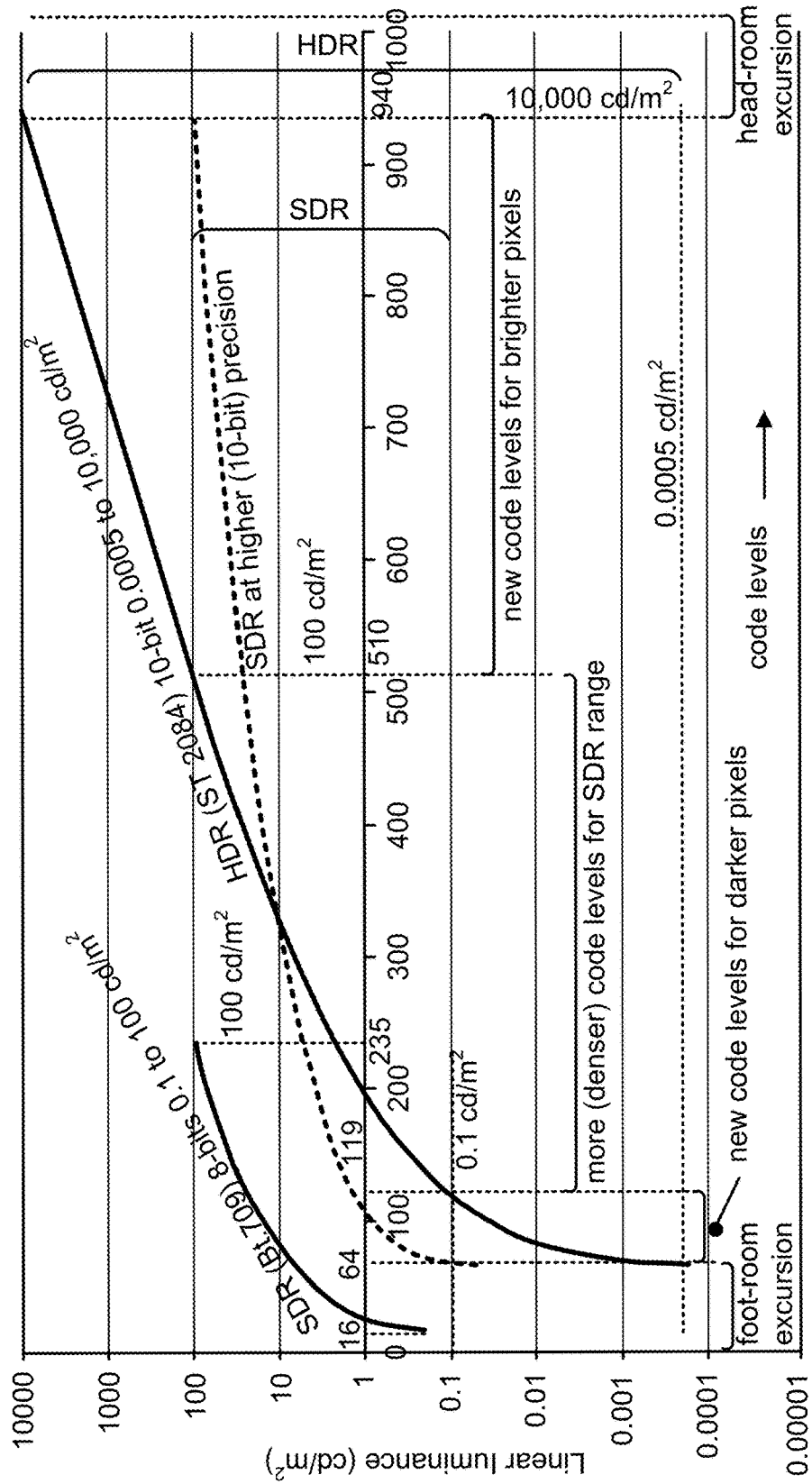
FIG. 8 is a conceptual diagram illustrating example Electro-Optical Transfer Functions (EOTFs).

FIG. 8 is a conceptual diagram illustrating example Electro-Optical Transfer Functions (EOTFs). FIG. 8 shows several examples of transfer functions (TFs). These mappings may also be applied to each R, G, and B component separately.

The reference EOTF specified ITU-R recommendation BT.1886 is specified by the equation:

$$L = a(\max[(V+b), 0])^\gamma$$

where:
L: Screen luminance in cd/m2
LW: Screen luminance for white
LB: Screen luminance for black
V: Input video signal level (normalized, black at V=0, to white at V=1. For content mastered per Recommendation ITU-R BT.709, 10-bit digital code values "D" map into values of V per the following equation: V=(D−64)/876
γ: Exponent of power function, γ=2.404
a: Variable for user gain (legacy "contrast" control)

$$a = (L_W^{1/\gamma} - L_B^{1/\gamma})^\gamma$$

b: Variable for user black level lift (legacy "brightness" control)

$$b = \frac{L_B^{1/\gamma}}{L_W^{1/\gamma} - L_B^{1/\gamma}}$$

The above variables a and b are derived by solving the following equations in order that V=1 gives:
L=LW and that V=0 gives L=LB:

$$L_B = a \cdot b^\gamma$$

$$L_W = a \cdot (1+b)^\gamma$$

In order to support higher dynamic range data more efficiently, SMPTE has standardized a new transfer function called SMPTE ST-2084. Specification of ST2084 defined the EOTF application as following. Video encoder 200 and video decoder 300 may be configured to apply a TF to normalized linear R, G, B values, which results in a non-linear representation of R'G'B'. ST2084 defines normalization by NORM=10000, which is associated with a peak brightness of 10000 nits (cd/m2).

$$R' = \text{PQ\_TF}(\max(0, \min(R/NORM, 1))) \quad (1)$$
$$G' = \text{PQ\_TF}(\max(0, \min(G/NORM, 1)))$$
$$B' = \text{PQ\_TF}(\max(0, \min(B/NORM, 1)))$$

$$\text{with PQ\_TF}(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Typically, EOTF is defined as a function with a floating-point accuracy; thus no error is introduced to a signal with this non-linearity if an inverse TF so called OETF is applied. An inverse TF (OETF) specified in ST2084 is defined as inversePQ function:

$$R = 10000 * \text{inversePQ\_TF}(R') \quad (2)$$
$$G = 10000 * \text{inversePQ\_TF}(G')$$
$$B = 10000 * \text{inversePQ\_TF}(B')$$

$$\text{with inversePQ\_TF}(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Note that the TF utilized in some video coding systems may be different from ST2084.

RGB data may be utilized as an input, as the RGB data may be produced by image capturing sensors. However, this color space has high redundancy among its components and is not optimal for compact representation. To achieve more compact and more robust representation, video encoder 200 and video decoder 300 may be configured to convert RGB components to a more uncorrelated color space more suitable for compression, e.g., YCbCr. This color space separates the brightness in the form of luminance and color information in different un-correlated components.

For modern video coding systems, a typically used colour space is YCbCr, as specified in ITU-R BT.709. The YCbCr colour space in the BT.709 standard specifies the following conversion process from R'G'B' to Y'CbCr (non-constant luminance representation):

$$Y' = 0.2126 * R' + 0.7152 * G' + 0.0722 * B' \quad (3)$$

$$Cb = \frac{B' - Y'}{1.8556}$$

$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627 * R' + 0.6780 * G' + 0.0593 * B' \quad (5)$$

$$Cb = \frac{B' - Y'}{1.8814}$$

$$Cr = \frac{R' - Y'}{1.4746}$$

The above can also be implemented using the following approximate conversion that avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B' \quad (6)$$

Video encoder 200 and video decoder 300 may be configured to convert input data in a target color space represented at high bit-depth (e.g., floating-point accuracy) to a target bit-depth. Certain studies show that 10-12 bits accuracy in combination with the PQ TF may be sufficient to provide HDR data of 16 f-stops with distortion below the just-noticeable difference (e.g., an accuracy where differences are barely noticeable by a human viewer). Data represented with 10 bits accuracy can be further coded with most of the state-of-the-art video coding solutions. This quantization is an element of lossy coding and is a source of inaccuracy introduced to converted data.

Example of such quantization applied to code words in target color space (in this example, the target color space is YCbCr) is shown below. Input values YCbCr represented in floating point accuracy are converted into a signal of fixed bit-depth BitDepthY for the Y value and BitDepthC for the chroma values (Cb, Cr).

$$D_Y=\text{Clip1}_Y(\text{Round}((1<<(\text{BitDepth}_Y-8))*(219*Y'+16)))$$

$$D_{Cb}=\text{Clip1}_C(\text{Round}((1<<(\text{BitDepth}_C-8))*(224*Cb+128)))$$

$$D_{Cr}=\text{Clip1}_C(\text{Round}((1<<(\text{BitDepth}_C-8))*(224*Cr+128))) \quad (7)$$

with

Round($x$)=Sign($x$)*Floor(Abs($x$)+0.5)

Sign($x$)=−1 if $x$<0, 0 if $x$=0, 1 if $x$>0

Floor($x$) the largest integer less than or equal to $x$

Abs($x$)=$x$ if $x$>=0, −$x$ if $x$<0

Clip1$_Y$($x$)=Clip3(0,(1<<BitDepth$_Y$)−1,$x$)

Clip1$_C$($x$)=Clip3(0,(1<<BitDepth$_C$)−1,$x$)

Clip3($x,y,z$)=$x$ if $z$<$x$, $y$ if $z$>$y$, $z$ otherwise

VVC Draft 6 provides general information on the VVC design and also provides an encoder-side description of VTM5. VVC Draft 6 has a block-based hybrid coding architecture, combining inter-picture and intra-picture prediction and transform coding with entropy coding. Video encoder 200 and video decoder 300 may be configured to apply picture partitioning that divides input video into blocks called CTUs. A CTU may be split using a quadtree with nested multi-type tree structure into CUs, with a leaf CU defining a region sharing the same prediction mode (e.g., intra or inter).

Figure 9:
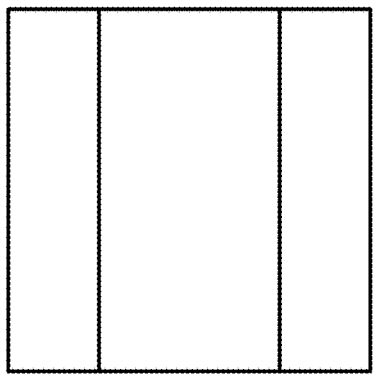
FIG. 9 is a conceptual diagram illustrating multi-type tree splitting modes.
Figure 9:
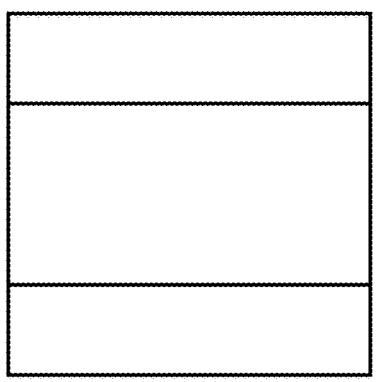
Figure 9:
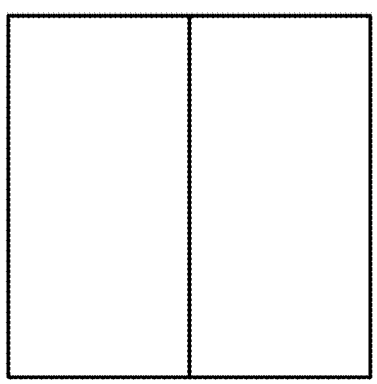
Figure 9:
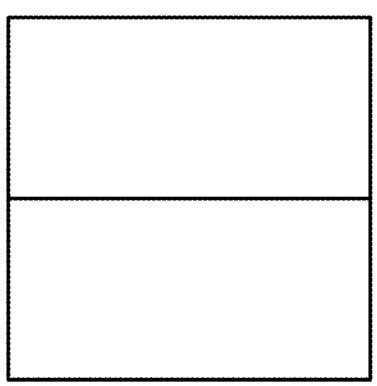

FIG. 9 is a conceptual diagram illustrating multi-type tree splitting modes. For a picture that has three sample arrays, a CTU may consist of an N×N block of luma samples together with two corresponding blocks of chroma samples. The maximum allowed size of the luma block in a CTU is specified in VVC Draft 6 to be 128×128 (although the maximum size of the luma transform blocks is 64×64).

Video encoder 200 and video decoder 300 may be configured to split a CTU into CUs to adapt to various local characteristics. A CU can have either a square or rectangular shape. A CTU is first partitioned by a quaternary tree (a.k.a. quadtree) structure. Then, the quaternary tree leaf nodes can be further partitioned by a multi-type tree structure. As shown in FIG. 9, there may be four splitting types in a multi-type tree structure: vertical binary splitting (SP- LIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation may be used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU.

Figure 10:
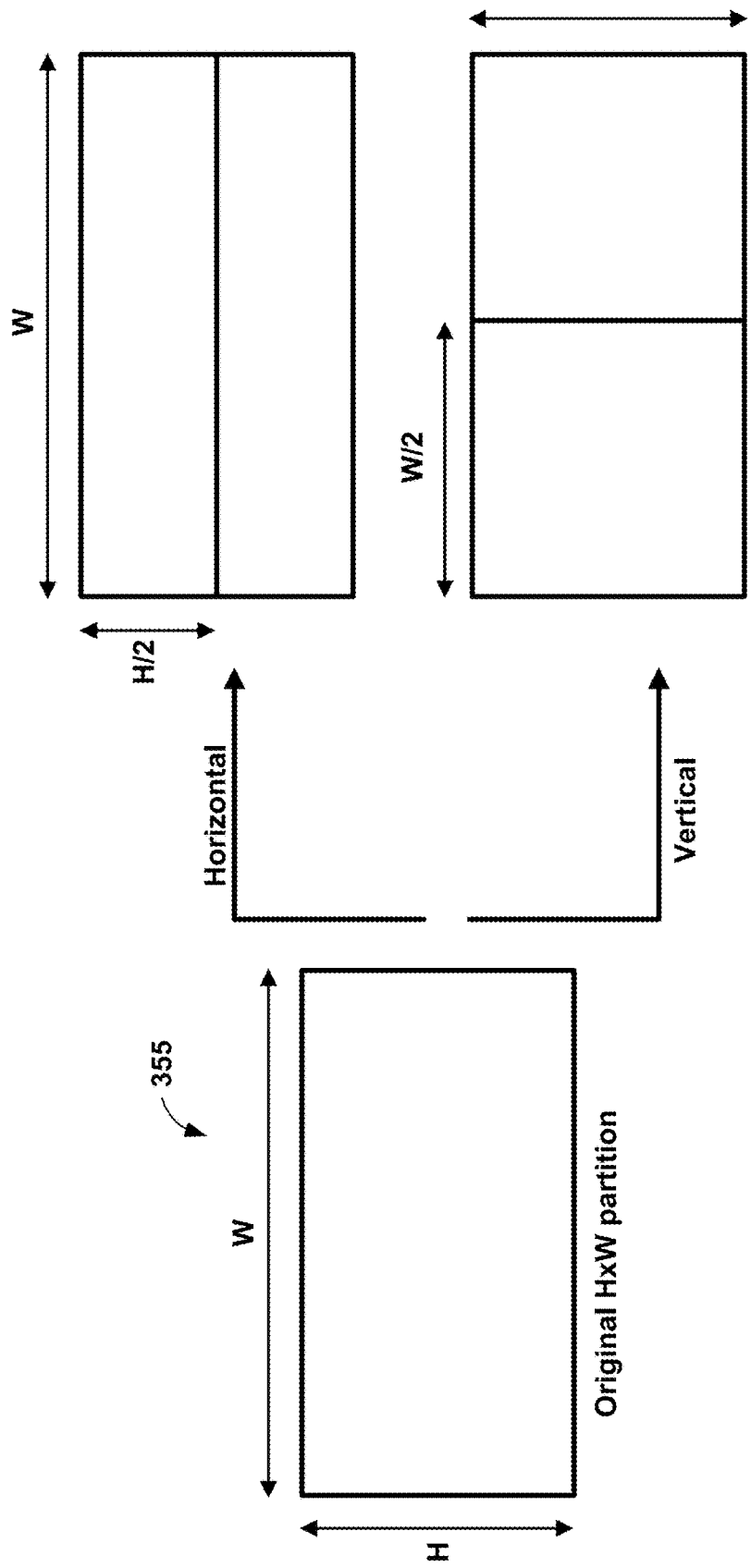
FIG. 10 is a conceptual diagram illustrating examples of sub-partitions for 4×8 and 8×4 CUs.
Figure 11:
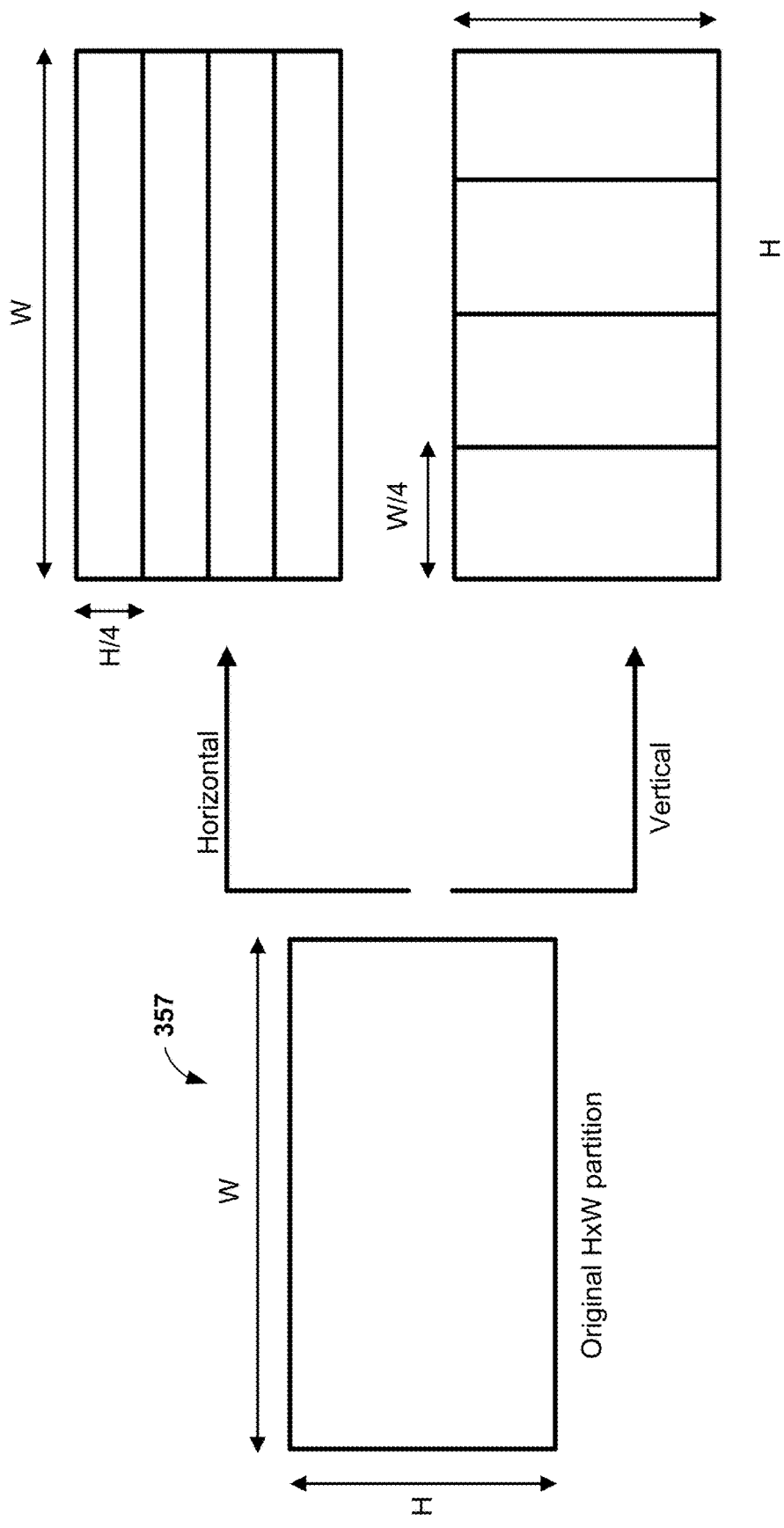
FIG. 11 is a conceptual diagram illustrating examples of sub-partitions for CUs other than 4×8, 8×4 and 4×4.

FIG. 10 is a conceptual diagram illustrating examples of sub-partitions of a CU 355 representing 4×8 and 8×4 CUs. FIG. 11 is a conceptual diagram illustrating examples of sub-partitions for a CU 357 representing CUs other than 4×8, 8×4 and 4×4. The Intra Sub-Partitions (ISP) tool divides luma intra-predicted blocks vertically or horizontally into 2 or 4 sub-partitions depending on the block size. For example, minimum block size for ISP may be 4×8 (or 8×4). If block size is greater than 4×8 (or 8×4) then the corresponding block may be divided by 4 sub-partitions. FIGS. 10 and 11 show examples of the two possibilities. All sub-partitions fulfil the condition of having at least 16 samples.

Figure 12:
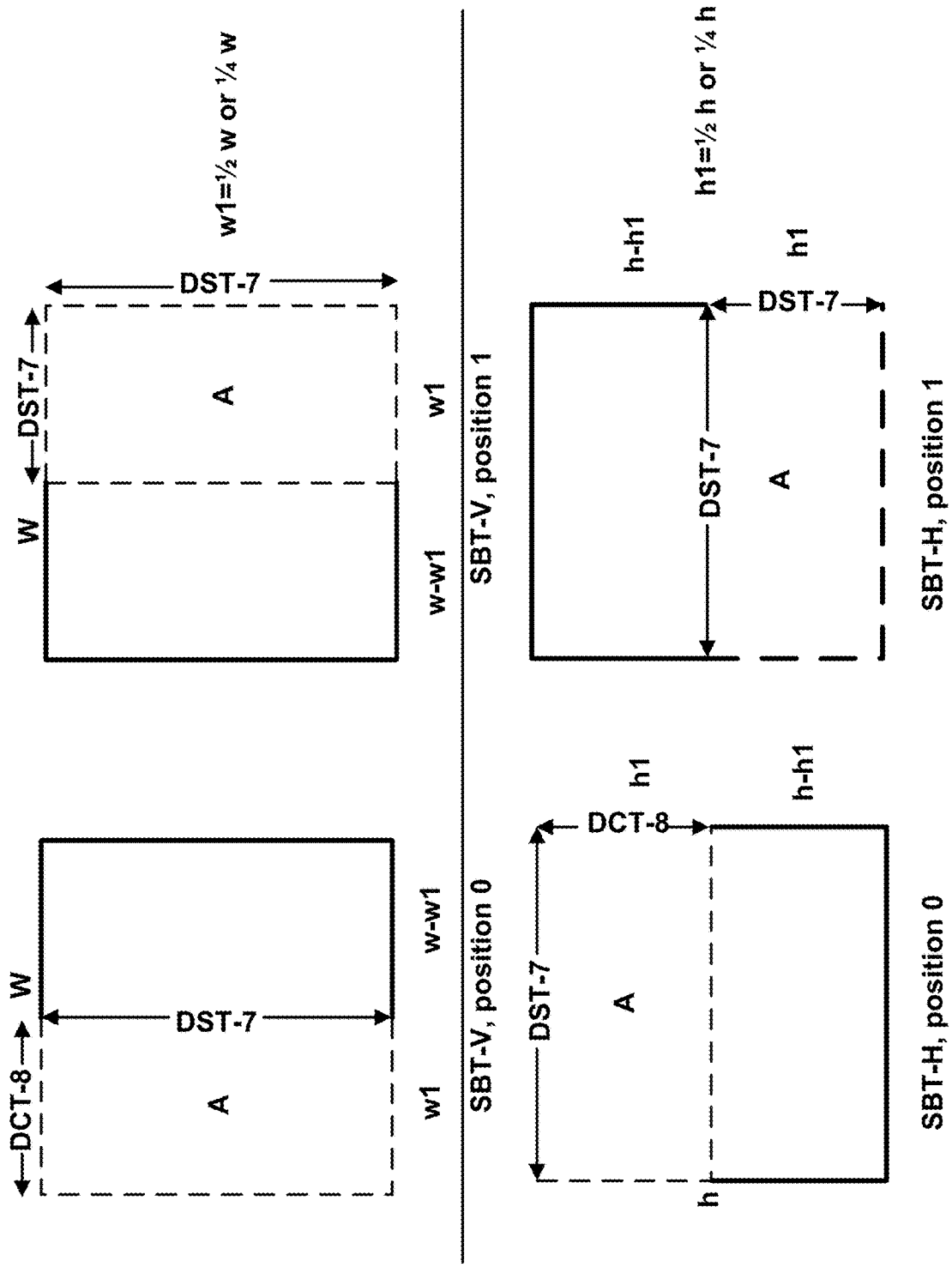
FIG. 12 is a conceptual diagram illustrating Sub-Block Transform (SBT) position, type, and transform type.

FIG. 12 is a conceptual diagram illustrating sub-block transform (SBT) position, type, and transform type. To enable transform coding, a video coder (e.g., video encoder 200 and/or video decoder 300) may process a block of luma and chroma samples (e.g., a TU). A maximum TU size with 64×64 luma transform block may include corresponding chroma transform blocks (32×32 for 4:2:0). A minimum TU size with 4×4 luma transform block may include corresponding chroma transform blocks (2×2 for 4:2:0). When the width or height of the CB is larger than the maximum transform width or height, a video coder (e.g., video encoder 200 or video decoder 300) may automatically split the CB in the horizontal and/or vertical direction to meet the maximum transform size restriction in that direction.

Additionally, in VTM, a sub-block transform (SBT) is introduced for an inter-predicted CU. In this transform mode, only a sub-part of the residual block is coded for the CU. There are two SBT types and two SBT positions, as indicated in FIG. 12. For SBT-V (or SBT-H), the TU width (or height) may be equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension may be disallowed. In some examples, there are at most 8 SBT modes for a CU.

Position-dependent transform core selection is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 12. For example, the horizontal and vertical transforms for SBT-V position 0 are DCT-8 and DST-7, respectively. When one side of the residual TU is greater than 32, the transform for both dimensions is set as DCT-2. Therefore, the sub-block transform jointly specifies the TU tiling, cbf, and horizontal and vertical core transform type of a residual block.

Video encoder 200 may be configured to signal a variable maxSbtSize in SPS to specify the max CU size for which SBT can be applied. In the VTM5, for HD and 4K sequences, maxSbtSize is set as 64 by the encoder; for other smaller resolution sequences, maxSbtSize is set as 32. The SBT is not applied to the CU coded with combined inter-intra mode or triangular partition mode (TPM) mode.

In the VTM5, the deblocking filtering process is mostly the same as those deblocking filtering processes in HEVC. However, the following modifications are added.

a) The filter strength of the deblocking filter may be dependent on the averaged luma level of the reconstructed samples. Said differently, for example, a video coder (e.g., video encoder 200 or video decoder 300) may be configured to determine one or more parameters for a deblocking filter based on the estimated local luma level for the samples of the reconstructed block. For example, the one or more parameters may include one or more of a frequency response of the deblocking filter, a filter tap length of the deblocking filter, or a filter type (e.g., 1-dimensional, 2-dimensional, linear, non-linear, etc.). In some examples, the one or more parameters may include one or more of a support area (e.g., 1-dimensional vertical, 1-dimensional horizontal, 2-dimensional, diamond search, etc.) of samples or a filter strength (e.g., a degree of smoothness).

b) Deblocking tC table extension.

c) Deblocking of luma component in 4×4 grid.

d) Stronger deblocking filter for luma.

e) Stronger deblocking filter for chroma.

In HEVC, the filter strength of the deblocking filter is controlled by the variables β and $t_C$ which are derived from the averaged quantization parameters $qP_L$.

Figure 13:
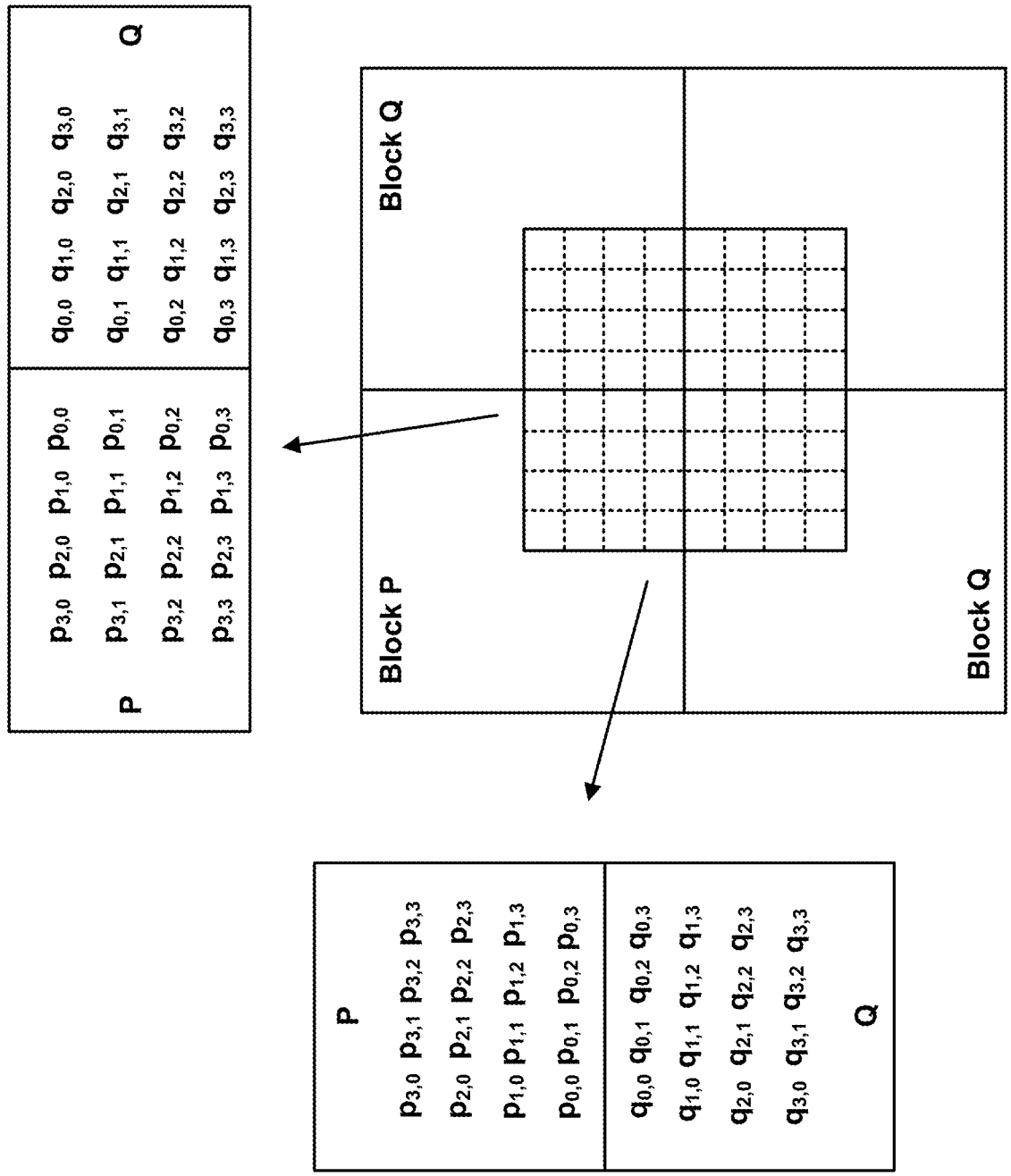
FIG. 13 is a conceptual diagram illustrating a sample position of $p_{i,k}$ and $q_{i,k}$.

FIG. 13 is a conceptual diagram illustrating a sample position of $p_{i,k}$ and $q_{i,k}$. In the VTM5, deblocking filter controls the strength of the deblocking filter by adding an offset to $qP_L$ according to the luma level of the reconstructed samples. The reconstructed luma level LL is derived as follow:

$$LL=((p_{0,0}+p_{0,3}+q_{0,0}+q_{0,3})>>2)/(1<<\text{bitDepth}) \quad (3\text{-}1)$$

where, the sample values $p_{i,k}$ and $q_{i,k}$ with i=0 . . . 3 and k=0 and 3 are derived as shown in FIG. 13.

The variable $qP_L$ is derived as follows:

$$qP_L=((Qp_Q+Qp_P+1)>>1)+qp\text{Offset} \quad (3\text{-}2)$$

where $Qp_Q$ and $Qp_P$ denote the quantization parameters of the coding units containing the sample $q_{0,0}$ and $p_{0,0}$, respectively. The offset qpOffset is dependent on a transfer function; the values may be signalled in the SPS.

In Ramasubramonian, et al. "AHG15: On signalling of chroma QP tables," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O0650-v4 (hereinafter "JVET-O0650"), a SPS level signaling of chroma QP tables, for the derivation of chroma QP from the collocated/corresponding luma block QP, is proposed. JVET-O0650 provides flexibility to use a different table for Cb and Cr components, and to adapt the table based on the nature of the video content (SDR/HDR-PQ/HDR-HLG). For example, a video coder (e.g., video encoder 200 or video decoder 300) may be configured to use different tables for the Cb and the Cr components. In some examples, the video coder may be configured to adapt the table based on the nature of the video content.

JVET-O0650 is adopted and used in the current VTM version (VTM-6.0, examples of which may be found at Chen, et al. "Algorithm description for Versatile Video Coding and Test Model 6 (VTM 6)," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O2002-v1).

For the derivation of β and $t_C$ for a chroma component, a video coder (e.g., video encoder 200 or video decoder 300) may derive the corresponding chroma QP from the luma QP in the following way:

$$qPi = \text{Clip3}(0, 63, ((Qp_Q + Qp_P + 1) >> 1) + cQp\text{PicOffset}) \quad (8\text{-}1132)$$

$$Qpc = \text{ChromaQpTable}[cIdx - 1][qPi] \quad (8\text{-}1133)$$

where $Qp_Q$ and $Qp_P$ denote the quantization parameters of the coding units of the luma component containing the luma sample $q_{0,0}$ and $p_{0,0}$, respectively. cQpPicOffset is signalled in the PPS level; cQpPicOffset provides an adjustment for the value of pps_cb_qp_offset or pps_cr_qp_offset, according to whether the filtered chroma component is the Cb or Cr component.

In the VTM5, a video coder (e.g., video encoder 200 or video decoder 300) controls the strength of the deblocking filter by adding an offset to $qP_L$ according to the luma level of the reconstructed samples. The video coder may derive the reconstructed luma level LL as follows:

$$LL = ((p_{0,0} + p_{0,3} + q_{0,0} + q_{0,3}) >> 2)/(1 << \text{bitDepth}) \quad (3\text{-}3)$$

where, the sample values $p_{i,k}$ and $q_{i,k}$ with i=0 ... 3 and k=0 and 3 are derived as shown in FIG. 13.

A video coder (e.g., video encoder 200 or video decoder 300) may estimate an average luma level for a boundary samples from 2 samples on each side of the filtered boundary for 4 samples segment. Utilization of the fixed sampling pattern for average luma level estimations may have the following drawbacks:

1. Estimated local luma level from a single 0th line on each side of the boundary may not be an accurate representation of local brightness, and is not aligned with other parameters, e.g., derivation estimated group of samples from 0th and 3rd lines/column. Said differently, a video coder (e.g., video encoder 200 or video decoder 300) may be configured to determine the estimated local luma level using intermediate lines within a P block or within a Q block and a group of samples from the zeroth lines and third lines per column of a video picture. For example, the video coder may determine the estimated local luma level using intermediate lines (e.g., lines between a 0th line/column and a N−1 line/column (e.g., a 3rd line/column) aligned with a first filter section representation for the current block, a second filter section representation for an adjacent block that is adjacent to the current block, and a group of samples from the zeroth lines and third lines per column of a video picture.
2. An estimated local luma level from a single 0th line on each side of the boundary (fixed grid 2×4) may not represent local brightness for samples being addressed by a longer deblocking filter, e.g., 3/5 or 7 filtered samples on each side. Said differently, a video coder (e.g., video encoder 200 or video decoder 300) may estimate the estimated local luma level using intermediate lines, where the estimated local luma level represents a local brightness of filtered samples on each side of the deblocking filter that results in 3, 5, or 7 final samples on each side of the deblocking filter.
3. For the deblocking of a chroma component, the qpOffset(LL) resulting from signal intensity is not considered for the calculation of qPi (i.e., the input to the ChromaQpTable).

This disclosure describes several processes to resolve drawbacks identified above. One or more of these processes may be applied independently, or in combination with others. A video coder (e.g., video encoder 200 or video decoder 300) may be configured to estimate a local luma level from a variable M×N sample pattern, where variables M and N can be integer values, with M or N being equal or larger than 1.

Figure 14:
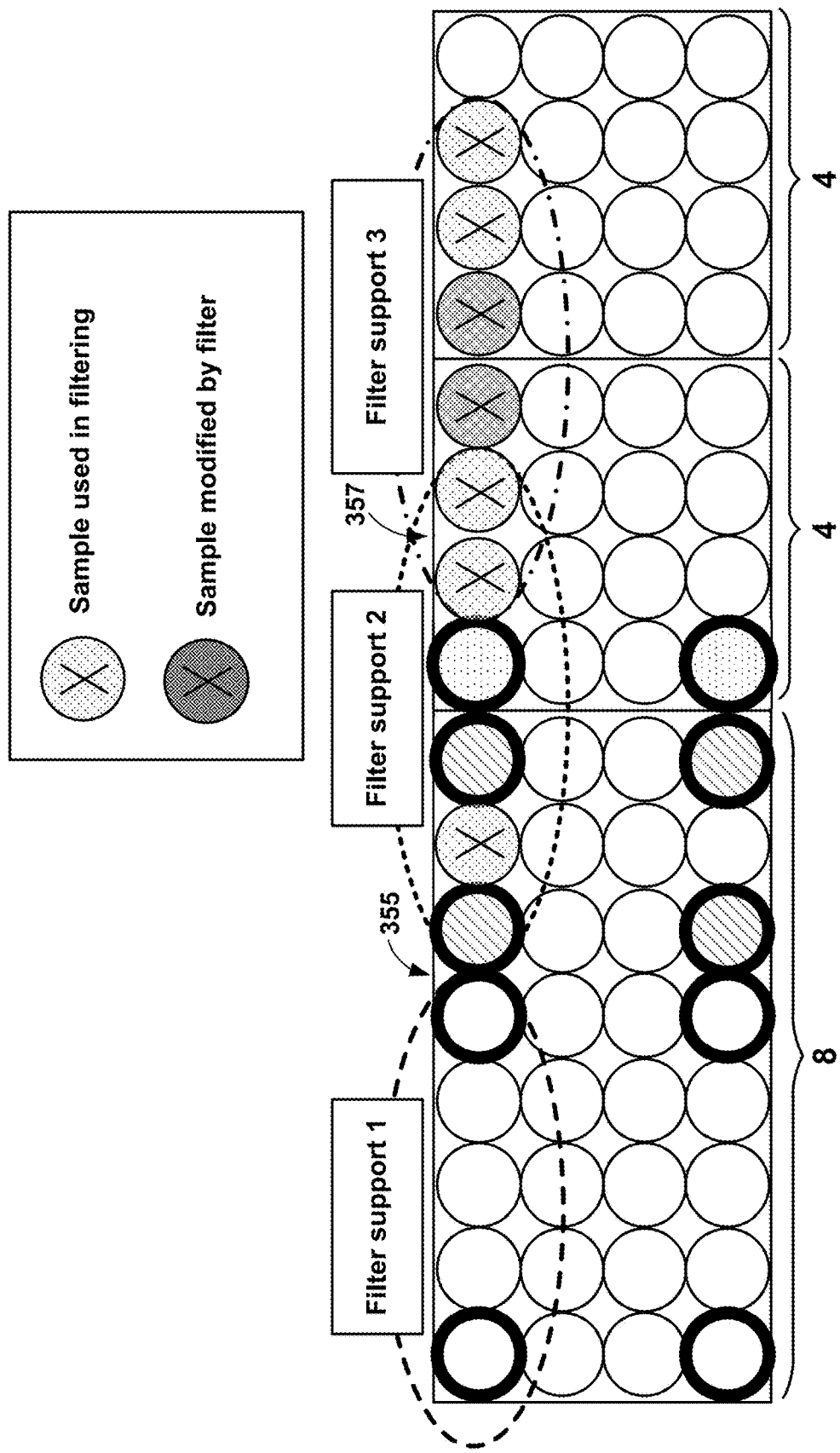
FIG. 14 is a conceptual diagram illustrating samples used to estimate a local luma level.

Visualization of some examples for such sample patterns is shown in FIG. 14. FIG. 14 is a conceptual diagram illustrating samples used to estimate a local luma level. In the example FIG. 14, a video coder (e.g., video encoder 200 or video decoder 300) may use samples shown as bolded black circles to estimate a local luma level for a boundary filtering offset. Three groups of sample patterns are shown, which are marked by "Filter support 1," "Filter support 2," and "Filter support 3." A bold black circle marks a sample pattern of 5×4, which can be utilized for a filter support type 1, e.g., for 5 samples filtering on the current side. Black circles with a diagonal pattern mark a sample pattern of size 3×4, which can be used for a filter support type 2, e.g., for 3 samples filtering on the current side. Black circles with horizontal lines are marking a sample pattern of size 1×4, which can be used for a filter support type 3 (a single sample marking), e.g., for 1 sample filtering on the current side.

In some examples, a video coder (e.g., video encoder 200 or video decoder 300) may be configured to estimate an average luma level from a sample pattern as follows, MP being an index of the M value applied at the P side of the boundary, and MQ being an index of the M value applied at the Q side of the filtered boundary:

$$LL_0 = (p_{0,0} + p_{0,MP-1} + q_{0,0} + q_{0,MQ-1})$$

$$LL_{N-1} = (p_{N-1,0} + p_{N-1,MP-1} + q_{N-1,0} + q_{N-1,MQ-1})$$

$$LL = ((LL_0 + LL_{N-1}) >> 3)/(1 << \text{bitDepth})$$

Said differently, a video coder (e.g., video encoder 200 or video decoder 300) may determine a variable M×N sample pattern based on one or more boundaries from block partitioning. That is, a video coder (e.g., video encoder 200 or video decoder 300) may determine a local luma level for filter support 2 using a luma level at four samples of block 355 and 2 samples of block 357. That is, the video coder may use fewer samples from block 357 than block 355 because block 357 has a smaller width (i.e., 4 samples) than a width of block 355 (i.e., 8 samples).

In some examples, a value of M or N (e.g., an index for the direction orthogonal to the filtering direction) can be fixed, e.g., being equal to 4 in the video coding system. A video coder (e.g., video encoder 200 or video decoder 300) may use the value of M or N to identify the lines or column being used to generate an average luma level estimate. Or, a value of M or N can be adaptively changed as a function of the block size. For instance, a video coder may be configured to set values of M and/or N as being fixed. In some instances, a video coder may be configured to adaptively change values of M and/or N as a function of the block size. For example, the video coder may determine a variable M×N sample pattern based on a block size of the current block and estimate a local luma level for samples of the reconstructed block using the variable M×N sample pattern. For instance, the video coder may be configured to set the value of M to 4 lines when the block size has a number of lines (e.g., a height) that is less than a threshold (e.g., 32) and may set the value of M to 8 lines when the block size has a number of lines (e.g., a height) that is not less than a threshold.

In some examples, the average luma level estimate can be computed not only using line 0, and line (N−1) (or line 3 for video coding system), but also using intermediate lines, i.e., line 1, line 2, . . . , line (N−2), to have a better estimate. For instance, a video coder (e.g., video encoder 200 or video decoder 300) may be configured to compute the average not only using line 0, and line (N−1), but also using one or more intermediate lines, i.e., line 1, line 2, . . . , line (N−2), to have a better estimate. For example, the video coder may calculate average luma using all of the lines for N=4 in the following way:

$$LL_i = (p_{i,0} + p_{i,MP-1} + q_{i,0} + q_{i,MQ})$$

$$LL = ((LL_0 + LL_1 + LL_2 + LL_3) >>> 4)/(1 << bitDepth)$$

That is, N is 4 and a video coder (e.g., video encoder 200 or video decoder 300) may calculate:

$$LLi = (pi, 0 + pi, MP-1 + qi, 0 + qi, MQ)$$

$$LL = ((LL0 + LL1 + LL2 + LL3) >>> 4)/(1 << bitDepth)$$

where LLi represents a local luma level for line i, pi,0 represents a sample at line i and column 0 of the current block, pi,MP−1 represents a sample at line i and column MP−1 of the current block, MP is set to M, qi,0 represents a sample at line i and column 0 of an adjacent block, qi,MQ represents a sample at line i and column MQ of the adjacent block, MQ is set to M, and LL is the estimated local luma level. In some examples, N may be different from 4 (e.g., less than 4 or more than 4).

Said differently, a video coder (e.g., video encoder 200 or video decoder 300) may compute an average of samples of a reconstructed block arranged within the variable M×N sample pattern using at least the intermediate line arranged between line 0 of the M×N sample pattern and line N−1 of the M×N sample pattern and line 0 of the M×N sample pattern.

In some examples, a video coder (e.g., video encoder 200 or video decoder 300) may be configured to determine values of M (MP for P-side and MQ for Q-side) from boundary blocks length (P-block or Q-block), orthogonal to the filtered boundary. For example, the video coder may be configured to derive values of M (MP for P-side and MQ for Q-side) as length/2 for parallel processing. If the current block contains several subblocks (for example and if the current block is using subblock merge or affine mode), then the video coder may derive values of M (MP for P-side and MQ for Q-side) as subblocklength/2 for parallel processing, when the deblocking filter is applied on subblock level. That is, if the current block uses subblock merge or affine mode, M is subblocklength/2 to enable parallel processing and an application of the luma deblocking is on a subblock level.

In some examples, a video coder (e.g., video encoder 200 or video decoder 300) may determine values of M (MP for P-side and MQ for Q-side) from a filter length applied to process filtered samples at the P or Q-side of the block boundary, e.g.: For variables defined in VVC Draft 6:

```
int maxFilterLengthP=m_maxFilterLengthP[COM-
    PONENT_Y][pos.x-m_ctuXLumaSamples]
    [pos.y-m_ctuYLumaSamples];
```

```
int maxFilterLengthQ=m_maxFilterLengthQ[COM-
    PONENT_Y][pos.x-m_ctuXLumaSamples]
    [pos.y-m_ctuYLumaSamples];
```

$$MP = \text{function}(maxFilterLengthP)$$

$$MQ = \text{function}(maxFilterLengthQ)$$

$$LL_0 = (p_{0,0} + p_{0,MP-1} + q_{0,0} + q_{0,MQ})$$

$$LL_{N-1} = (p_{N-1,0} + p_{N-1,MP-1} + q_{N-1,0} + q_{N-1,MQ-1})$$

$$LL = ((LL_0 + LL_{N-1}) >>> 3)/(1 << bitDepth)$$

That is, a video coder (e.g., video encoder 200 or video decoder 300) may determine a value of M further based on a filter tap length of the deblocking filter.

In some examples, a video coder may set values of M (MP for P-side and MQ for Q-side) equal to maxFilterLengthP and maxFilterLengthQ, respectively. In some examples, a video coder may be configured to derive M values as from maxFilterLengthP and maxFilterLengthQ to capture the most relevant number of samples, e.g., being set to maxFilterLengthP/KP and maxFilterLengthQ/KQ respectively, where KP and KQ variables determine the samples used to derive average luma level at the P and Q side of the filtered boundary. That is, the video coder may set M equal to a filter tap length of the deblocking filter.

In some examples, a video coder may be configured to estimate a weighted average luma level from this sample pattern as follows, MP being the M value applied at the P side of the boundary, and MQ being the M value applied at the Q side of the filtered boundary:

$$LL_0 = (w0 * p_{0,0} + wM * p_{0,MP-1} + w0 * q_{0,0} + wM * q_{0,MQ})$$

$$LL_{N-1} = (w0 * p_{N-1,0} + wM * p_{N-1,MP-1} + w0 * q_{N-1,0} + w - M * q_{N-1,MQ-1})$$

$$LL = (((LL_0 + LL_{N-1})/(w0 + wM)) >>> 2)/(1 << bitDepth)$$

That is, the estimated local luma level may be an average and a video coder (e.g., video encoder 200 or video decoder 300) may be configured to compute the estimated local luma level using at least one intermediate line (e.g., $LL_{N-1}$) and a zeroth line (e.g., $LL_0$). In some examples, the video coder may calculate a weighted average for samples of the reconstructed block using the variable M×N sample pattern.

In some examples, for the derivation of QP for the chroma component (Qpc), a video coder (e.g., video encoder 200 or video decoder 300) may apply a qpOffset of the co-located luma block (e.g., due to a luma signal intensity) for the derivation of qPi. For example, the video coder may apply the following, with changes marked between **, such that the video coder may employ more deblocking (e.g., a higher filter strength) for the co-located chroma block (e.g., due to higher β and $t_C$):

```
qPi = Clip3( 0, 63, ( ( Qp_Q + Qp_P + 1) >> 1 +qpOffset) + cQpPicOffset)
Qp_C = ChromaQpTable[ cIdx − 1 ][ qPi ]
Set forth below is an example of changes to VVC draft 6 with changes marked between
**:
    const int chromaQPOffset = pps.getQpOffset(ComponentID( chromaIdx + 1 ) );
    Pel* piTmpSrcChroma = (chromaIdx == 0) ? piTmpSrcCb : piTmpSrcCr;
    #if JVET_O0650_SIGNAL_CHROMAQP_MAPPING_TABLE
        int iQP = sps.getMappedChromaQpValue(ComponentID(chromaIdx + 1),
((cuP.qp + cuQ.qp + 1) >> 1 +iShift));
        iQP = Clip3(0, MAX_QP, iQP + chromaQPOffset);
    #else
```

That is, a local luma level or a control offset for luma deblocking filtering may be used to control a chroma deblocking filter. In some examples, a quantization parameter value (e.g., qpOffset) for a chroma component is based on a quantization parameter offset value for a co-located luma block using the estimated local luma level. For example, a video coder (e.g., video encoder 200 or video decoder 300) may apply the deblocking filter based on the quantization parameter value (e.g., qpOffset) to filtered chroma samples of a reconstructed chroma block co-located with the reconstructed luma block to generate filtered chroma samples. For instance, the video coder may determine an offset parameter for the filtered luma samples and apply the deblocking filter based on the offset parameter for the filtered luma samples.

Set forth below is an example of changes to VVC draft 6 with changes marked between **:

```
            int maxFilterLengthP = m_maxFilterLengthP[COMPONENT_Y][pos.x-m_ctuXLumaSamples][pos.y-m_ctuYLumaSamples];
            int maxFilterLengthQ = m_maxFilterLengthQ[COMPONENT_Y][pos.x-m_ctuXLumaSamples][pos.y-m_ctuYLumaSamples];
            if (maxFilterLengthP > 3)
            {
              sidePisLarge = true;
              if ( maxFilterLengthP > 5 )
              {
                // restrict filter length if sub-blocks are used (e.g affine or ATMVP)
                if (cuP.affine)
                {
                  maxFilterLengthP = std::min(maxFilterLengthP, 5);
                }
              }
            }
      #if LUMA_ADAPTIVE_DEBLOCKING_FILTER_QP_OFFSET
            if ( sps.getLadfEnabled( ) )
            {
              int iShift = 0;
              int pelsInPart = pcv.minCUWidth;
              int N = pelsInPart;
              deriveLADFShift( piTmpSrc + iSrcStep * (iIdx*pelsInPart), iStride, iShift,
      edgeDir, sps, maxFilterLengthP-1, maxFilterLengthQ-1, N-1);
              iQP += iShift;
            }
      #endif
```

With function deriveLADF Shift being defined as follows (changes to the VVC draft 6 are marked between **):

```
      #if LUMA_ADAPTIVE_DEBLOCKING_FILTER_QP_OFFSET
      void LoopFilter::deriveLADFShift( const Pel* src, const int stride, int& shift,
      const DeblockEdgeDir edgeDir, const SPS, int MP, int MQ, int N)
      {
         uint32_t lumaLevel = 0;
         shift = sps.getLadfQpOffset(0);
         if (edgeDir == EDGE_VER)
         {
            lumaLevel = (src[0] + src[3*stride] + src[-1] + src[3*stride - 1]);
            lumaLevel += (src[0] + src[3*stride] + src[-1] + src[3*stride - 1]);
            lumaLevel = (src[0] + src[MP] + src[-1] + src[-1- MQ]);
            **src += N*stride;**
            lumaLevel+ = (src[0] + src[MP] + src[-1] + src[-1- MQ]);
         }
         else // (edgeDir == EDGE_HOR)
         {
            lumaLevel = (src[0] + src[**MP*stride**] + src[-stride] + src[**-stride * MQ**]);
            src += N;
            lumaLevel+ = (src[0] + src[**MP*stride**] + src[-stride] + src[**-stride * MQ**]);
         }
```

Set forth below is another example of changes to the VVC draft 6 with changes marked between**:

Derive the maximal filter of the filter at either side

```
            int maxFilterLengthP = m_maxFilterLengthP[COMPONENT_Y][pos.x-m_ctuXLumaSamples][pos.y-m_ctuYLumaSamples];
            int maxFilterLengthQ = m_maxFilterLengthQ[COMPONENT_Y][pos.x-m_ctuXLumaSamples][pos.y-m_ctuYLumaSamples];
              if (maxFilterLengthP > 3)
              {
                sidePisLarge = true;
                if ( maxFilterLengthP > 5 )
```

```
        {
            // restrict filter length if sub-blocks are used (e.g affine or ATMVP)
            if (cuP.affine)
            {
                maxFilterLengthP = std::min(maxFilterLengthP, 5);
            }
        }
    }
#if LUMA_ADAPTIVE_DEBLOCKING_FILTER_QP_OFFSET
    if ( sps.getLadfEnabled( ) )
    {
        int iShift = 0;
        int pelsInPart = pcv.minCUWidth;
        int N = ( ( ( edgeDir == EDGE_VER ) ? lumaArea.height / K : lumaArea.width / K ) );
        deriveLADFShift( piTmpSrc + iSrcStep * (iIdx*pelsInPart), iStride, iShift,
edgeDir, sps, maxFilterLengthP-1, maxFilterLengthQ-1, N-1);
        iQP += iShift;
    }
#endif
```

Figure 15:
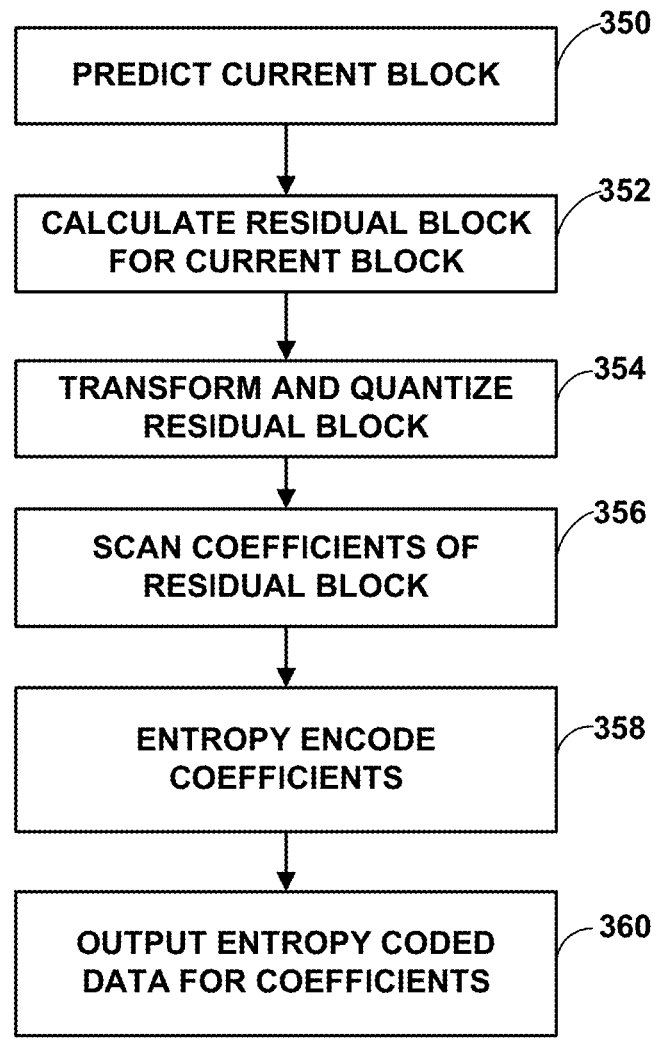
FIG. 15 is a flowchart illustrating an example method for encoding a current block.

FIG. 15 is a flowchart illustrating an example method for encoding a current block. The current block may comprise a current CU. Although described with respect to video encoder 200 (FIGS. 1 and 3), it should be understood that other devices may be configured to perform a method similar to that of FIG. 15.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Figure 16:
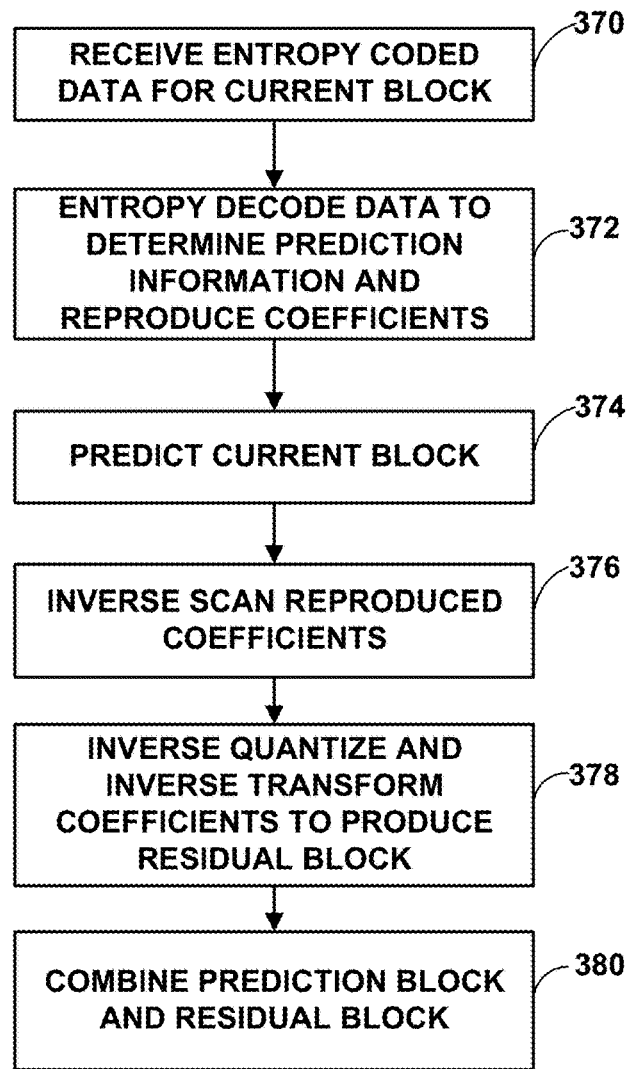
FIG. 16 is a flowchart illustrating an example method for decoding a current block of video data.

FIG. 16 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 16.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may inverse quantize and inverse transform the coefficients to produce a residual block (378). Video decoder 300 may ultimately decode the current block by combining the prediction block and the residual block (380).

Figure 17:
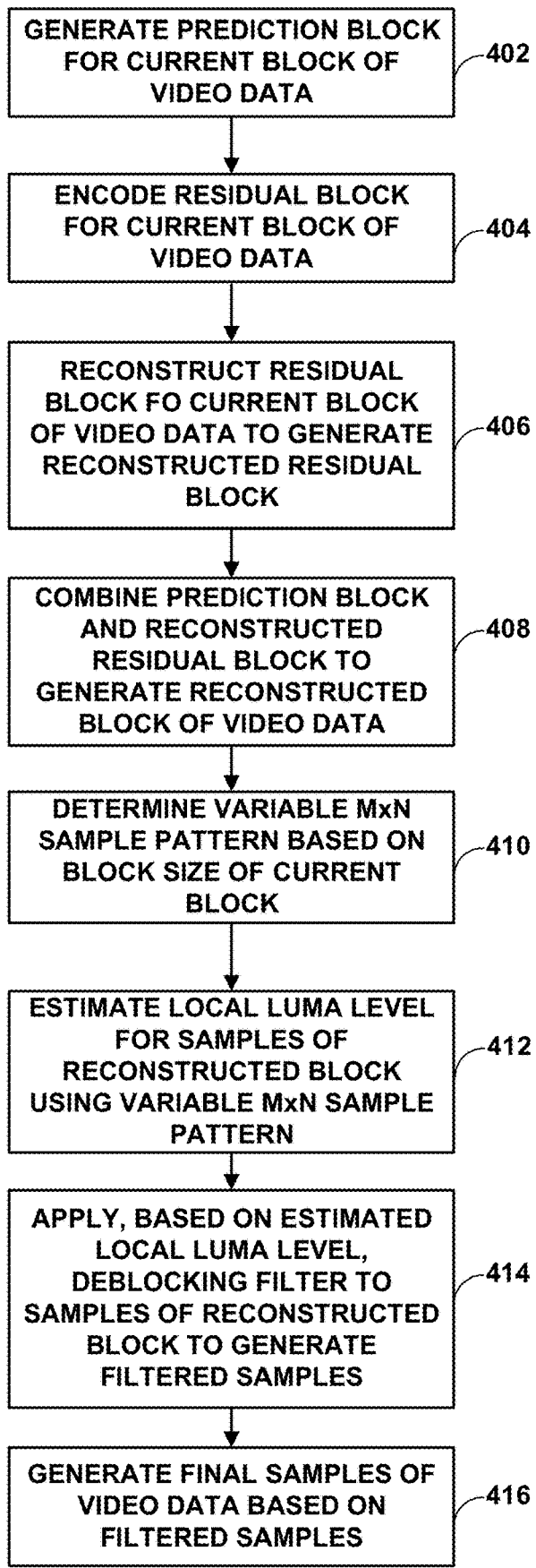
FIG. 17 is a flowchart illustrating an example method for encoding a current block using a variable M×N sample pattern.

FIG. 17 is a flowchart illustrating an example method for encoding a current block using a variable M×N sample pattern. The current block may comprise a current CU. Although described with respect to video encoder 200 (FIGS. 1 and 3), other devices may be configured to perform a method similar to that of FIG. 17.

Mode selection unit 202 generates a prediction block for a current block of the video data (402). Entropy encoding unit 220 with transform processing unit 206 and quantization unit 208 encodes a residual block for the current block of the video data (404). Inverse quantization unit 210 and inverse transform processing unit 212 reconstructs the residual block for the current block of the video data to generate a reconstructed residual block (406). Reconstruction unit 214 combines the prediction block and the reconstructed residual block to generate a reconstructed block of the video data (408). Sample pattern unit 217 determines a variable M×N sample pattern based on a block size of the current block (410). In some examples, M and N are each integer values being equal to or larger than 1. Filter unit 216 estimates a local luma level for samples of the reconstructed block using the variable M×N sample pattern (412). Filter unit 216 applies, based on the estimated local luma level, a deblocking filter to the samples of the reconstructed block to generate filtered samples (414). Filter unit 216 generates final samples of the video data based on the filtered samples (416). Filter unit 216 outputs the generated final samples of video data.

Figure 18:
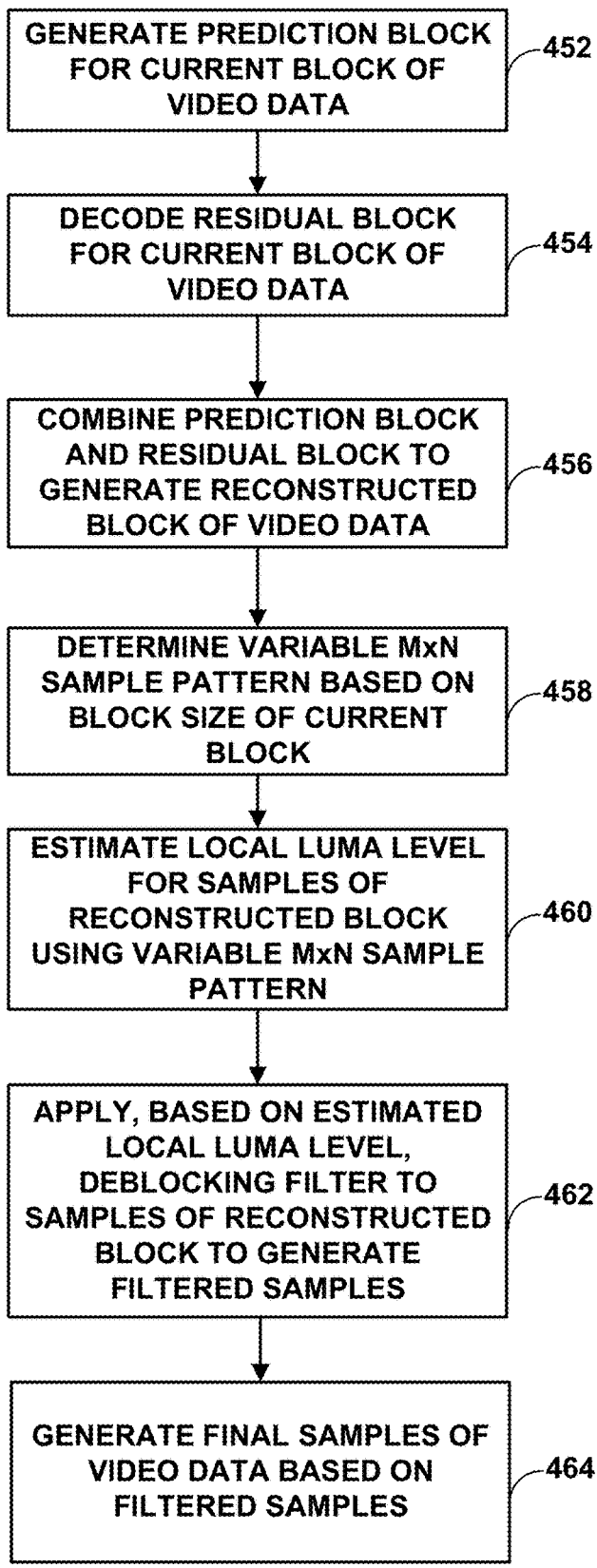
FIG. 18 is a flowchart illustrating an example method for decoding a current block of video data using a variable M×N sample pattern.

FIG. 18 is a flowchart illustrating an example method for decoding a current block of video data using a variable M×N sample pattern. The current block may comprise a current CU. Although described with respect to video decoder 300 (FIGS. 1 and 4), other devices may be configured to perform a method similar to that of FIG. 18.

Prediction processing unit 304 generates a prediction block for a current block of the video data (452). Entropy decoding unit 302 with inverse quantization unit 306 and inverse transform processing unit 308 decodes a residual block for the current block of the video data (454). Reconstruction unit 310 combines the prediction block and the residual block to generate a reconstructed block of the video data (456). Sample pattern unit 313 determines a variable M×N sample pattern based on a block size of the current block (458). In some examples, M and N are each integer values being equal to or larger than 1. Filter unit 312 estimates a local luma level for samples of the reconstructed block using the variable M×N sample pattern (460). Filter unit 312 applies, based on the estimated local luma level, a deblocking filter to the samples of the reconstructed block to generate filtered samples (462). Filter unit 312 generates final samples of the video data based on the filtered samples (464). DPB 314 may output the final samples of the video data.

A non-limiting illustrative list of examples of the techniques of this disclosure is provided below.

Example 1

A method of coding video data, the method comprising: determining a variable M×N sample pattern, wherein M and N are each integer values being equal to or larger than 1; estimating a local luma level from the variable M×N sample pattern; and determining a prediction block for a current block of the video data based on the estimated local luma level.

Example 2

The method of example 1, wherein the M value is fixed.

Example 3

The method of example 1, wherein the N value is fixed.

Example 4

The method of example 1, further comprising: adaptively changing the M value or the N value based on block size of the current block.

Example 5

The method of any of examples 1-4, wherein estimating comprises: computing the estimated local luma level using intermediate lines.

Example 6

The method of any of examples claims 1-5, further comprising: determining values of M based on a boundary block length.

Example 7

The method of any of examples 1-6, further comprising: determining values of M based on a filter length.

Example 8

The method of any of examples 1, 3, 5, further comprising: setting the value of M equal to a max filter length.

Example 9

The method of any of examples 1-8, wherein coding comprises decoding.

Example 10

The method of any of examples 1-9, wherein coding comprises encoding.

Example 11

A device for coding video data, the device comprising one or more means for performing the method of any of examples 1-10.

Example 12

The device of example 11, wherein the one or more means comprise one or more processors implemented in circuitry.

Example 13

The device of any of examples 11 and 12, further comprising a memory to store the video data.

Example 14

The device of any of examples 11-13, further comprising a display configured to display decoded video data.

Example 15

The device of any of examples 11-14, wherein the device comprises one or more of a camera, a computer, a mobile device, a broadcast receiver device, or a set-top box.

Example 16

The device of any of examples 11-15, wherein the device comprises a video decoder.

Example 17

The device of any of examples 11-16, wherein the device comprises a video encoder.

Example 18

A computer-readable storage medium having stored thereon instructions that, when executed, cause one or more processors to perform the method of any of examples 1-10.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method of decoding video data, the method comprising:
   generating a prediction block for a current block of the video data;
   decoding a residual block for the current block of the video data;
   combining the prediction block and the residual block to generate a reconstructed block of the video data;
   determining a variable M×N sample pattern based on a block size of the current block, wherein M and N are each integer values being equal to or larger than 1;
   estimating a local luma level for samples of the reconstructed block using the variable M×N sample pattern, wherein estimating the estimated local luma level comprises calculating a weighted average for samples of the reconstructed block using the variable M×N sample pattern;
   applying, based on the estimated local luma level, a deblocking filter to the samples of the reconstructed block to generate filtered samples; and
   generating final samples of the video data based on the filtered samples.

2. The method of claim 1, wherein applying the deblocking filter comprises determining one or more parameters for the deblocking filter based on the estimated local luma level for the samples of the reconstructed block.

3. The method of claim 2, where the one or more parameters for the deblocking filter include one or more of a frequency response of the deblocking filter, a filter tap length of the deblocking filter, or a filter type of the deblocking filter.

4. The method of claim 2, where the one or more parameters for the deblocking filter include one or more of a support area of samples or a filter strength.

5. The method of claim 1, wherein determining the variable M×N sample pattern is further based on one or more boundaries from block partitioning.

6. The method of claim 1, wherein estimating comprises determining the estimated local luma level using intermediate lines, wherein the estimated local luma level represents local brightness of filtered samples on each side of the deblocking filter that results in 3, 5, or 7 final samples on each side of the deblocking filter.

7. The method of claim 1, wherein estimating comprises determining the estimated local luma level using intermediate lines within a P block or within a Q block and a group of samples from the zeroth lines and third lines per column of a video picture.

8. The method of claim 1, wherein the estimated local luma level or a control offset for luma deblocking filtering is used to control a chroma deblocking filter.

9. The method of claim 1, wherein a quantization parameter value for a chroma component is based on a quantization parameter offset value for a co-located luma block using the estimated local luma level.

10. The method of claim 1, wherein the weighted average of the estimated local luma level is computed using at least one intermediate line and a zeroth line.

11. The method of claim 1, wherein:
   if the current block uses subblock merge or affine mode, M is a length of a subblock divided by 2 to enable parallel processing and an application of the luma deblocking is on a subblock level.

12. The method of claim 1, further comprising determining M further based on a filter tap length of the deblocking filter.

13. The method of claim 1, further comprising setting M equal to a filter tap length of the deblocking filter.

14. The method of claim 1, wherein N is 4 and wherein estimating the estimated local luma level comprises calculating:

$$LLi=(pi,0+pi,MP-1+qi,0+qi,MQ)$$

$$LL=((LL0+LL1+LL2+LL3)>>>4)/(1<<bitDepth)$$

wherein LLi represents a local luma level for line i, pi,0 represents a sample at line i and column 0 of the current block, pi,MP−1 represents a sample at line i and column MP−1 of the current block, MP is set to M, qi,0 represents a sample at line i and column 0 of an adjacent block, qi,MQ represents a sample at line i and column MQ of the adjacent block, MQ is set to M, and LL is the estimated local luma level.

15. A method of encoding video data, the method comprising:
generating a prediction block for a current block of the video data;
encoding a residual block for the current block of the video data;
reconstructing the residual block for the current block of the video data to generate a reconstructed residual block;
combining the prediction block and the reconstructed residual block to generate a reconstructed block of the video data;
determining a variable M×N sample pattern based on a block size of the current block, wherein M and N are each integer values being equal to or larger than 1;
estimating a local luma level for samples of the reconstructed block using the variable M×N sample pattern, wherein estimating the estimated local luma level comprises calculating a weighted average for samples of the reconstructed block using the variable M×N sample pattern;
applying, based on the estimated local luma level, a deblocking filter to the samples of the reconstructed block to generate filtered samples; and
generating final samples of the video data based on the filtered samples.

16. The method of claim 15, wherein applying the deblocking filter comprises determining one or more parameters for the deblocking filter based on the estimated local luma level for the samples of the reconstructed block.

17. The method of claim 16, where the one or more parameters for the deblocking filter include one or more of a frequency response of the deblocking filter, a filter tap length of the deblocking filter, or a filter type of the deblocking filter.

18. The method of claim 16, where the one or more parameters for the deblocking filter include one or more of a support area of samples or a filter strength.

19. The method of claim 15, wherein determining the variable M×N sample pattern is further based on one or more boundaries from block partitioning.

20. The method of claim 15, wherein estimating comprises determining the estimated local luma level using intermediate lines, wherein the estimated local luma level represents local brightness of filtered samples on each side of the deblocking filter that results in 3, 5, or 7 final samples on each side of the deblocking filter.

21. The method of claim 15, wherein estimating comprises determining the estimated local luma level using intermediate lines within a P block or within a Q block and a group of samples from the zeroth lines and third lines per column of a video picture.

22. The method of claim 15, wherein the estimated local luma level or a control offset for luma deblocking filtering is used to control a chroma deblocking filter.

23. The method of claim 15, wherein a quantization parameter value for a chroma component is based on a quantization parameter offset value for a co-located luma block using the estimated local luma level.

24. The method of claim 15, wherein the weighted average of the estimated local luma level is computed using at least one intermediate line and a zeroth line.

25. The method of claim 15, wherein:
if the current block uses subblock merge or affine mode, M is a length of a subblock divided by 2 to enable parallel processing and an application of the luma deblocking is on a subblock level.

26. The method of claim 15, further comprising determining M further based on a filter tap length of the deblocking filter.

27. The method of claim 15, further comprising setting M equal to a filter tap length of the deblocking filter.

28. A device for decoding video data, the device comprising one or more processors implemented in circuitry and configured to:
generate a prediction block for a current block of the video data;
decode a residual block for the current block of the video data;
combine the prediction block and the residual block to generate a reconstructed block of the video data;
determine a variable M×N sample pattern based on a block size of the current block, wherein M and N are each integer values being equal to or larger than 1;
estimate a local luma level for samples of the reconstructed block using the variable M×N sample pattern, wherein, to estimate the estimated local luma level, the one or more processors are configured to calculate a weighted average for samples of the reconstructed block using the variable M×N sample pattern;
apply, based on the estimated local luma level, a deblocking filter to the samples of the reconstructed block to generate filtered samples; and
generate final samples of the video data based on the filtered samples.

29. A device for encoding video data, the device comprising one or more processors implemented in circuitry and configured to:
generate a prediction block for a current block of the video data;
encode a residual block for the current block of the video data;
reconstruct the residual block for the current block of the video data to generate a reconstructed residual block;
combine the prediction block and the reconstructed residual block to generate a reconstructed block of the video data;
determine a variable M×N sample pattern based on a block size of the current block, wherein M and N are each integer values being equal to or larger than 1;
estimate a local luma level for samples of the reconstructed block using the variable M×N sample pattern, wherein, to estimate the estimated local luma level, the one or more processors are configured to calculate a weighted average for samples of the reconstructed block using the variable M×N sample pattern;
apply, based on the estimated local luma level, a deblocking filter to the samples of the reconstructed block to generate filtered samples; and
generate final samples of the video data based on the filtered samples.

* * * * *